(12) United States Patent
Regni et al.

(10) Patent No.: US 10,366,070 B2
(45) Date of Patent: Jul. 30, 2019

(54) LOCKING AND I/O IMPROVEMENTS OF SYSTEMS BUILT WITH DISTRIBUTED CONSISTENT DATABASE IMPLEMENTATIONS WITHIN AN OBJECT STORE

(71) Applicant: Scality, S.A., Paris (FR)

(72) Inventors: Giorgio Regni, Albany, CA (US); Vianney Rancurel, La Frette s/Seine (FR); Mudit Verma, New Delhi (IN)

(73) Assignee: Scality S.A., Paris (FR)

(*) Notice: Subject to any disclaimer, the term of this patent is extended or adjusted under 35 U.S.C. 154(b) by 369 days.

(21) Appl. No.: 14/627,962

(22) Filed: Feb. 20, 2015

(65) Prior Publication Data

US 2016/0246834 A1    Aug. 25, 2016

(51) Int. Cl.
    *G06F 16/00*    (2019.01)
    *G06F 16/23*    (2019.01)
(52) U.S. Cl.
    CPC ................... *G06F 16/2343* (2019.01)
(58) Field of Classification Search
    USPC .......................................................... 707/704
    See application file for complete search history.

(56) References Cited

U.S. PATENT DOCUMENTS

| | | | |
|---|---|---|---|
| 5,937,402 A | 8/1999 | Pandit | |
| 7,051,033 B2 | 5/2006 | Agarwal et al. | |
| 7,478,263 B1 * | 1/2009 | Kownacki | G06F 11/2028 714/10 |
| 7,500,020 B1 | 3/2009 | Kabra et al. | |
| 8,055,622 B1 | 11/2011 | Botes et al. | |
| 8,200,706 B1 | 6/2012 | Sim-Tang | |
| 8,260,792 B1 | 9/2012 | Hsu | |
| 8,352,431 B1 | 1/2013 | Protopopov et al. | |
| 8,429,444 B2 | 4/2013 | Rancurel et al. | |
| 8,775,428 B2 | 7/2014 | Birdwell et al. | |
| 8,825,602 B1 | 9/2014 | Desai et al. | |
| 9,152,648 B2 | 10/2015 | Regni et al. | |
| 9,280,591 B1 * | 3/2016 | Kharatishvili | G06F 17/30575 |

(Continued)

FOREIGN PATENT DOCUMENTS

| | | |
|---|---|---|
| EP | 0 458 564 A2 | 11/1991 |
| WO | 2005024552 A3 | 11/2006 |

OTHER PUBLICATIONS

Chandy, K. Mani, et al., Distributed Snapshots: Determining Global States of Distributed Systems, ACM Transactions on Computer Systems, Feb. 1985, pp. 63-75, vol. 3, No. 1. University of Texas at Austin and Stanford Research Institute.

(Continued)

*Primary Examiner* — Bai D Vu
(74) *Attorney, Agent, or Firm* — Compass IP Law PC

(57) ABSTRACT

A storage system is described. The storage system includes an object store having a plurality of objects containing information. The storage system also includes a cluster of locking nodes to implement a distributed synchronization locking mechanism. The cluster of locking nodes include a proposer node and a plurality of acceptor nodes. The proposer node to broadcast to the acceptor nodes a proposed lock on at least some of the information. The acceptor nodes to vote on the proposed lock based on respective locking information kept in a local store of each acceptor node.

25 Claims, 27 Drawing Sheets

(56) References Cited

U.S. PATENT DOCUMENTS

| | | | |
|---|---|---|---|
| 9,311,135 | B2 | 4/2016 | Regni et al. |
| 9,524,302 | B2 | 12/2016 | Regni et al. |
| 9,632,828 | B1* | 4/2017 | Mehta .................. G06F 9/5011 |
| 9,652,334 | B2* | 5/2017 | Junqueira ............ G06F 11/1464 |
| 2004/0088301 | A1 | 5/2004 | Mahalingam et al. |
| 2005/0203819 | A1 | 9/2005 | Rogers et al. |
| 2006/0106878 | A1 | 5/2006 | Shitomi et al. |
| 2008/0040565 | A1 | 2/2008 | Rozas et al. |
| 2008/0059541 | A1 | 3/2008 | Fachan et al. |
| 2008/0183973 | A1 | 7/2008 | Aguilera et al. |
| 2009/0077327 | A1 | 3/2009 | Hara |
| 2009/0112880 | A1 | 4/2009 | Oliveira et al. |
| 2009/0112908 | A1 | 4/2009 | Wintel et al. |
| 2009/0150364 | A1 | 6/2009 | Melander et al. |
| 2009/0254693 | A1 | 10/2009 | Karamanolis et al. |
| 2010/0082538 | A1 | 4/2010 | Rentsch et al. |
| 2010/0191884 | A1 | 7/2010 | Holenstein et al. |
| 2010/0199040 | A1 | 8/2010 | Schnapp et al. |
| 2011/0106778 | A1* | 5/2011 | Chan .................. G06F 17/30362 707/704 |
| 2011/0302583 | A1 | 12/2011 | Abadi et al. |
| 2012/0059963 | A1* | 3/2012 | Pasupuleti ........ G06F 17/30362 710/200 |
| 2012/0296872 | A1 | 11/2012 | Frost et al. |
| 2013/0080559 | A1* | 3/2013 | Rao ..................... H04L 67/1097 709/208 |
| 2014/0258239 | A1 | 9/2014 | Amlekar et al. |
| 2014/0280187 | A1 | 9/2014 | Molaro |
| 2014/0324785 | A1* | 10/2014 | Gupta ............... G06F 17/30368 707/689 |
| 2015/0254272 | A1 | 9/2015 | Regni et al. |
| 2015/0379009 | A1* | 12/2015 | Reddy .................. G06F 17/3033 707/747 |
| 2016/0004720 | A1 | 1/2016 | Tabaaloute et al. |

OTHER PUBLICATIONS

Pilarski, Slawomir, et al., Checkpointing for Distributed Databases: Starting from the Basics, IEEE Transactions on Parallel and Distributed Systems, Sep. 1992, vol. 3, No. 5, pp. 602-610, School of Computing Science, Simon Fraser University, Burnaby, B.C. Canada.

Dabek, Frank et al., Wide-Area Cooperative Storage with CFS, SOSP '01, Oct. 21-24, 2001, 14 pages, MIT Laboratory for Computer Science, Banff, Canada.

Peterson, Zachary N. J., et al., Ext3cow: A Time-Shifting File System for Regulatory Compliance, ACM Transactions on Storage, vol. 1, Issue 2, May 2005, 21 pages.

Bonwick, Jeff, et al., The Zettabyte File System, 2003, 13 pages.

MacCormick, John., et al., Boxwood: Abstractions as the Foundation for Storage Infrastructure, 2004, 16 pages, Microsoft Research Silicon Valley.

Henson, Val, et al., Double the Metadata, Double the Fun: A COW-like Approach to File System Consistency, 2004, 5 pages, IBM, Inc.

Rodeh, Ohad, B-trees, Shadowing, and Clones, 2007, 51 pages, IBM Haifa Research Labs.

Shaull, Ross, et al., Skippy: A New Snapshot Indexing Method for Time Travel in a Storage Manager, SIGMOD '08, Jun. 9-12, 2008, pp. 637-648, Department of Computer Science, Brandeis University, Waltham, Massachusetts.

Aguilera, Marcos K., et al., A Practical Scalable Distributed B-Tree, PVLDB '08, Aug. 23-28, 2008, pp. 598-609, Auckland, New Zealand.

Kara, Jan, Ext4, btrfs, and others, SUSE Labs, 2008, 13 pages, Czech Republic.

Kasampalis, Sakis, Chapter 3 "Copy on Write based file systems" from Copy on Write Based File Systems Performance Analysis and Implementation, 2010, Technical University of Denmark, Department of Informatics, Kongens Lyngby, Denmark, 94 pages.

Wu, Sai, et al., Efficient B-tree Based Indexing for Cloud Data Processing, Proceedings of the VLDB Endowment, 2010, 12 pages, vol. 3, No. 1, School of Computing, National University of Singapore, Singapore.

SnapLock® Compliance and Snaplock Enterprise Software, Datasheet, 2006, 2 pages.

EMC ISILON SnapShotIQ, Datasheet, 2012, 2 pages.

Klosowski, Przemek, B-Tree File System BTRFS, DCLUG, Aug. 2009, 14 pages.

Bonwick, Jeff, et al., ZFS The Last Word in File Systems, SDC Storage Developer Conference, SNIA Santa Clara, 2009, 44 pages.

"The Non-Volatile Systems Laboratory NV—Heaps: Fast and Safe Persistent Objects", http://nvsl.ucsd.edu/nvuheaps/, 2 pgs., Sep. 1, 2011.

Notification of Transmittal of the International Search Report and the Written Opinion, in related PCT/US2015/018836, dated Nov. 3, 2015, 17 pages.

Cohen, et al ., "Version Management in Gypsy", Software Engineering Notes, ACM, New York, New York, vol. 13, No. 5, Nov. 1, 2998, pp. 201-215.

Kasampalis, "Write Based File Systems Performance Analysis and Implementation", 2010, Technical University of Denmark, Department of Informatics, Kongens Lyngby, Denmark, 94 pages.

Notice of Allowance for U.S. Appl. No. 15/163,560, dated Feb. 6, 2019, 10 pages.

Notice of Allowance for U.S. Appl. No. 14/485,585, dated Aug. 27, 2018, 6 pages.

Office Action for U.S. Appl. No. 15/163,560, dated Jul. 27, 2018 , 24 pages.

Office Action for U.S. Appl. No. 15/384,159, dated Nov. 7, 2018, 11 pages.

* cited by examiner

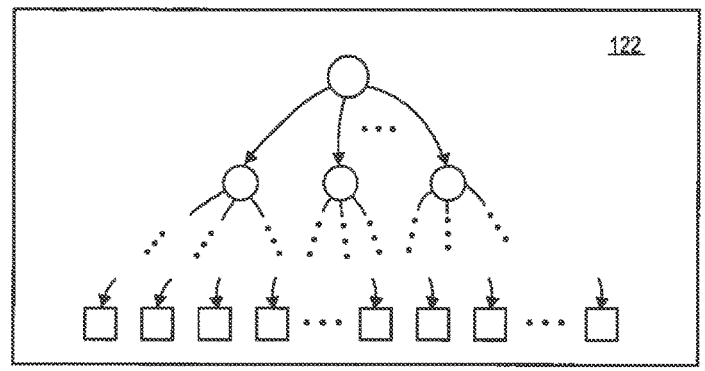
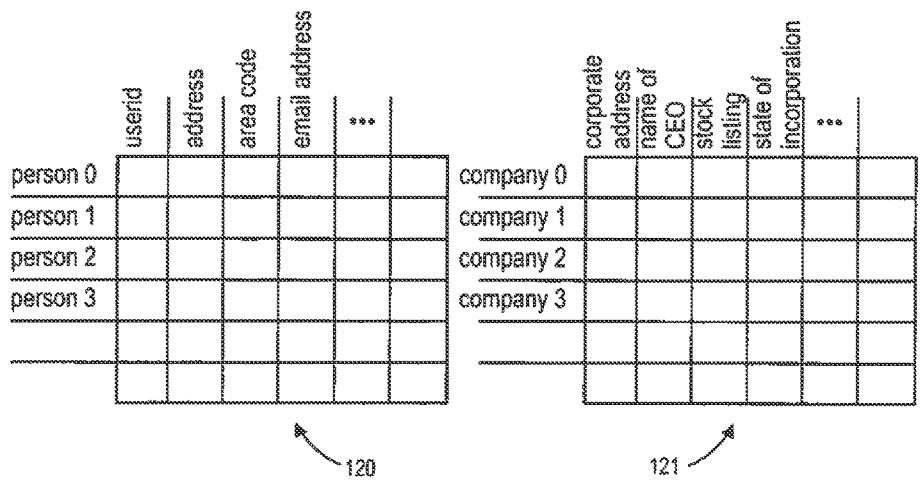
FIG. 1E
(PRIOR ART)

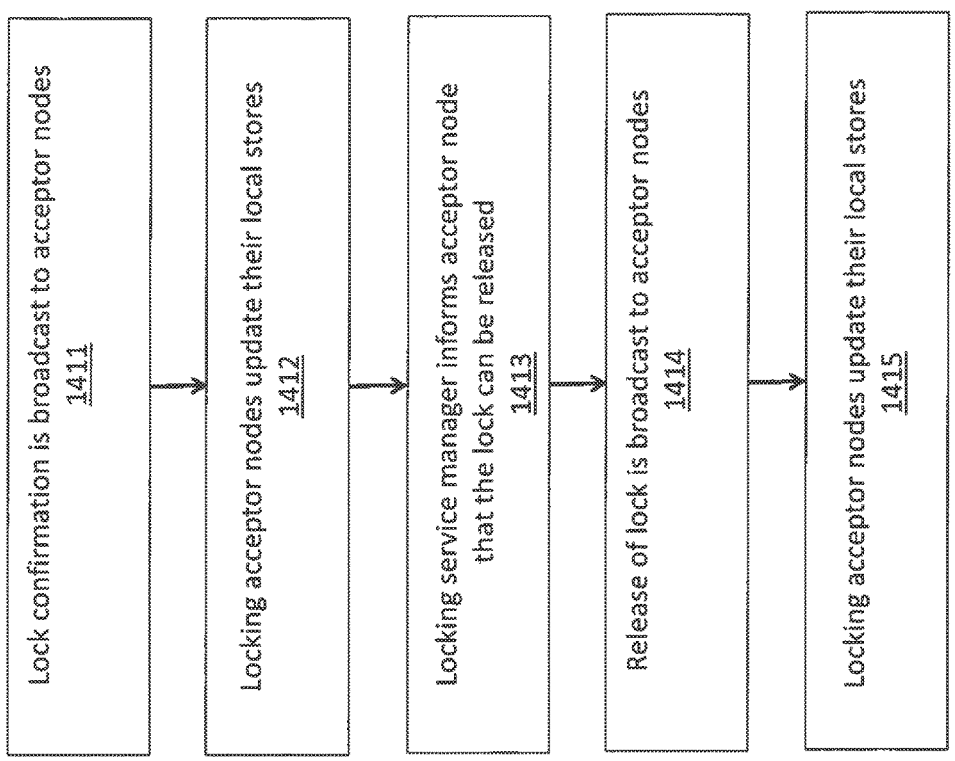

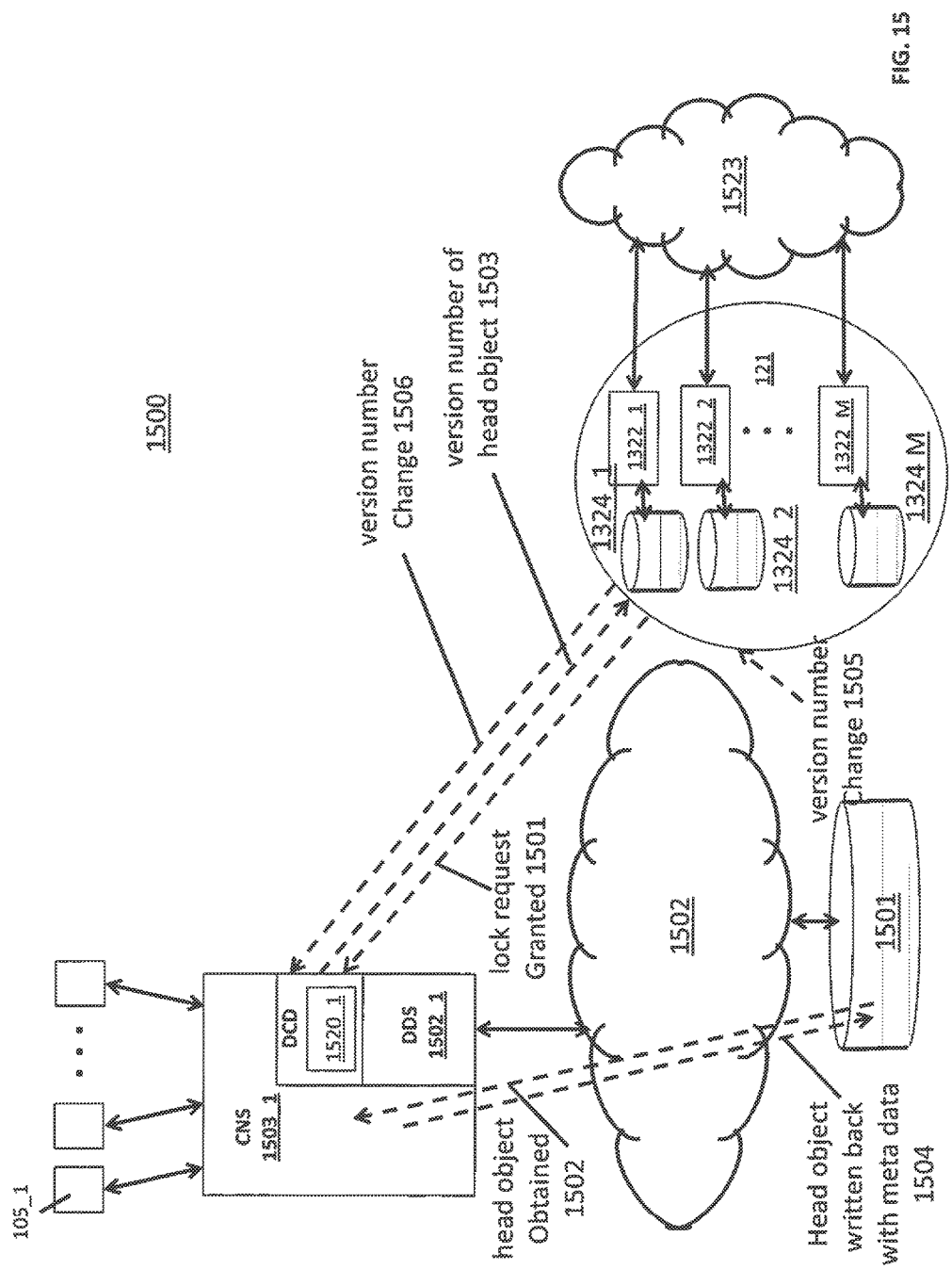

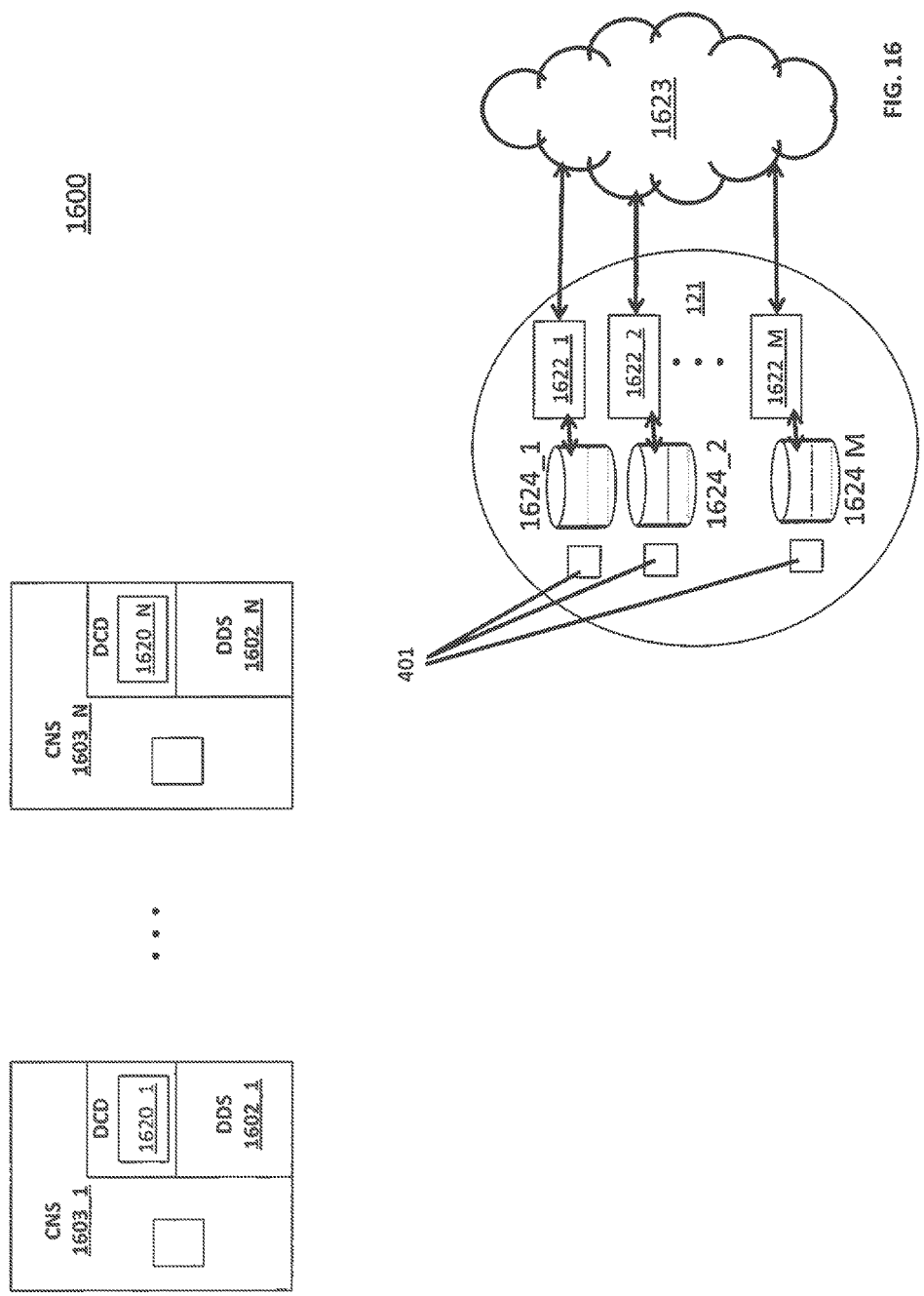

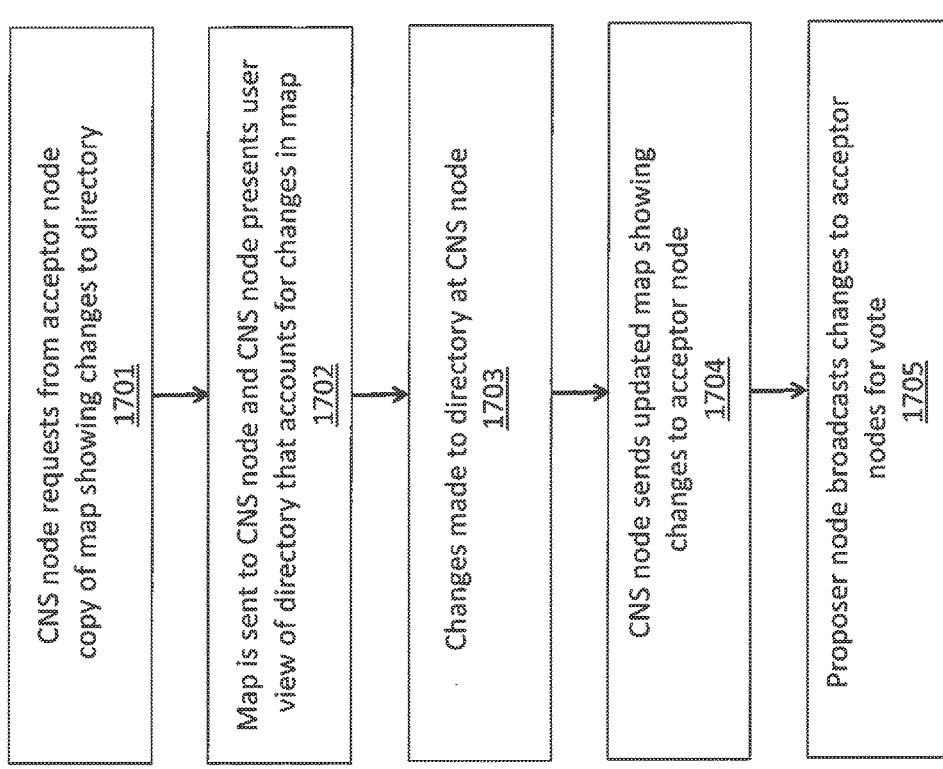

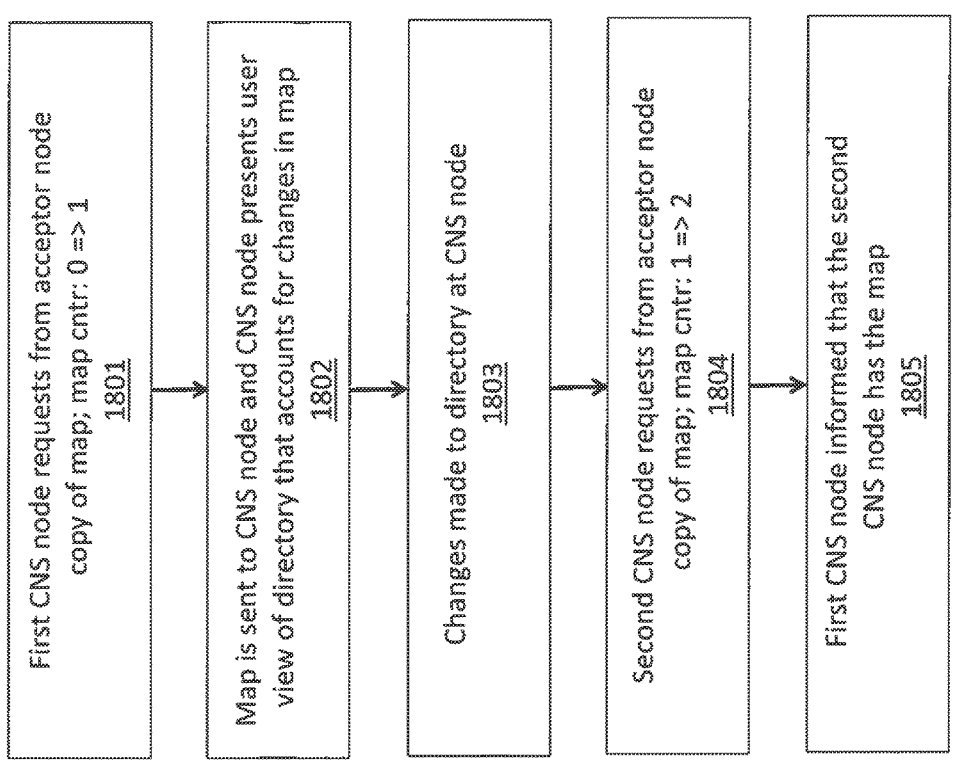

LOCKING AND I/O IMPROVEMENTS OF SYSTEMS BUILT WITH DISTRIBUTED CONSISTENT DATABASE IMPLEMENTATIONS WITHIN AN OBJECT STORE

FIELD OF THE INVENTION

The field of invention relates generally to the computing sciences and more specifically to locking and I/O improvements of systems built with distributed consistent database implementations within an object store.

BACKGROUND

FIG. 1 depicts three primary types of storage systems. As will be made more clear immediately below, what differentiates each of the storage systems from one another is the mechanism that is used to access the stored information.

FIG. 1a shows basic object storage. In the case of an object store, a requestor 101 requests access to a specific item of stored information ("an object") from the object store 102 by way of an "object ID" 103. An object ID is a uniquely identifying reference of a specific object with the store (e.g. a randomly assigned alphanumeric character). Another type of store that conceptually has a large degree of overlap with an object store is a "key-value" store. By definition, a key-value store maps individually stored information (i.e., the "values") to individual keys that are uniquely assigned to the values. A specific set of stored values are accessed by providing the store with the key for those values. Thus, the "key" corresponds to an "object ID" and the "values" correspond to an "object".

FIG. 1b shows file directory based storage. In the case of file directory based storage individual items of stored information are kept in files 104_1 through 104_N. Files are organized into a directory where any sub-directory 106_1 through 106_M can include one or more files or one or more lower sub-directories. A specific item of information is obtained by accessing its file. The file is accessed by articulating the path through the directory that leads to the file. For example, in the exemplary directory of FIG. 1b, file 104_3 is accessed by articulating "C/FOO/BAR/NOTES".

FIG. 1c shows block based storage. In the case of block based storage, the storage resource is viewed as being broken down into contiguous blocks 107_1 through 107_N. A specific item of information is accessed by identifying the block where it resides. A common type of block storage is a "thin provisioning" system in which a block is identified by an offset within a larger "logical" storage resource. Thin provisioned systems have been traditionally used to more efficient use of physical storage resources as unused block segments do not occupy physical storage space. For example, a logical file (e.g., as contemplated by an operating system) may include active data portions or "stripes" where actual data resides and "unused" portions where no substantive data resides.

The unused portions may correspond, for instance, to regions that have not been written to yet. The "real" data that was been written to is written in "stripes". For example, if FIG. 1 represents a logical file that spans offset 80 through 106, stripes 80-87 and stripes 100-106 contain real data and are stored in physical storage while offset values 88-99 are understood to contain 0s that are not actually stored in physical storage.

While FIGS. 1a-1c depict core physical storage solutions by themselves, FIG. 1d shows a fundamental usage case or implementation of any of these core storage solutions. FIG. 1d shows a traditional "database" storage implementation. As observed in FIG. 1d, the traditional database storage implementation includes a database interface 108, an indexing layer 109 and a storage layer 110.

The database interface layer 108 accepts queries to the database storage (e.g., according to some type of predefined structured query language (e.g., SQL) or other query format). A common feature of queries is that they often identify data by its content rather than a particular address where the sought for data is found. For example, a query submitted through interface 108 might ask for all email addresses having a specific string (e.g., "@abc.com"). It is the role of the indexing and storage layers 109, 110 to actually find the targeted information.

The indexing layer 109 exists to speedup lookups into the storage layer 110. As a point of comparison, without the indexing layer 109, a query for a particular item of information within the storage layer 110 would be accomplished primarily by scrolling through each item of information kept by the storage layer 110 until the sought for information was found.

The function of the indexing layer 109 is similar to the index at the end of a textbook. With input criteria specifying the sought after information (e.g., "@abc.com"), the index returns with one or more pointers or other information useable to fetch the specifically requested information from the storage layer 110. Thus the indexing layer 109 can be viewed as a mechanism for effectively searching the contents of the underlying storage layer 110.

The storage layer 110 corresponds to the resources used to actually store the information and can be implemented with any of the storage systems discussed above with reference to FIGS. 1a through 1c.

FIG. 1e depicts the implementation of a relational database. As is understood in the art a relational database is typically contemplated as a collection of tables. The individual rows of the various tables are viewed as the records that are kept by the relational database. The columns of a particular table are used to keep the various data items for a particular row. For example, referring to table 120, if each row represents a particular person, a first column may be used to keep the person's name, a second column may be used to keep the person's phone number, a third column may be used to keep the person's email address, etc. Rows whose data content are defined by the same set of columns are logically viewed as being kept within the same table.

Typically, one column of a table is identified as the "primary key" used to identify a particular row within the table. For example, continuing with the example above where each row represents a person, one column of a table may be used for a "userid" that uniquely identifies the person. With the userid for a particular person, the row in the table for the particular person can be easily fetched. In this sense, the userid also acts as a primary key for accessing the table as well. Here, a primary key may include a combination of an identifier of the table and an identifier of a specific row within the table. The columns of a table may also include the primary keys of (rows of) other tables to establish "relationships" between records. For example, if the columns of table 120 table keep the personal information for specific people, one of these columns may include the primary key for another table 121 that keeps records on the employers of these people.

Thus, if a logic operation desires to know specific information about an employer of a particular individual, the logic operation may first access the person's record from table 120 with the userid for that person and obtain the primary key for the row in table 121 that contains information about the person's employer.

Relational databases can also be "queried" for specific information. For example, the relational database discussed above could be queried to provide the names of all people who have a specific area code in their phone number. Here, the first table 120 would be accessed, all the records having the sought for area code would be extracted and the information from the name column of these extracted records would be provided as the query result.

Note that an indexing layer 122 could be used to speed up the querying process. That is, rather than simply access the table 121 and scroll row-by-row through it for records having the desired area code, instead, an index layer 121 could be built on top of the tables 120, 121 that is designed to provide the primary keys of people based on their area code. Here, the index 121 can take the form of a B+ tree whose nodes are associated with specific area code numeric ranges with a narrower range being specified moving down through the tree. Eventually the leaf pages of the B+ tree are reached that provide specific primary keys for specific people having a specific area code. In a basic approach there is a separate index for every column in a table so that any query for any item of information within the table can be sped up as described above. Of course, any changes to the records in the table will need to be reflected in the index.

FIGURES

FIGS. 1a through 1e pertain to prior art storage technologies;

Figure 2:
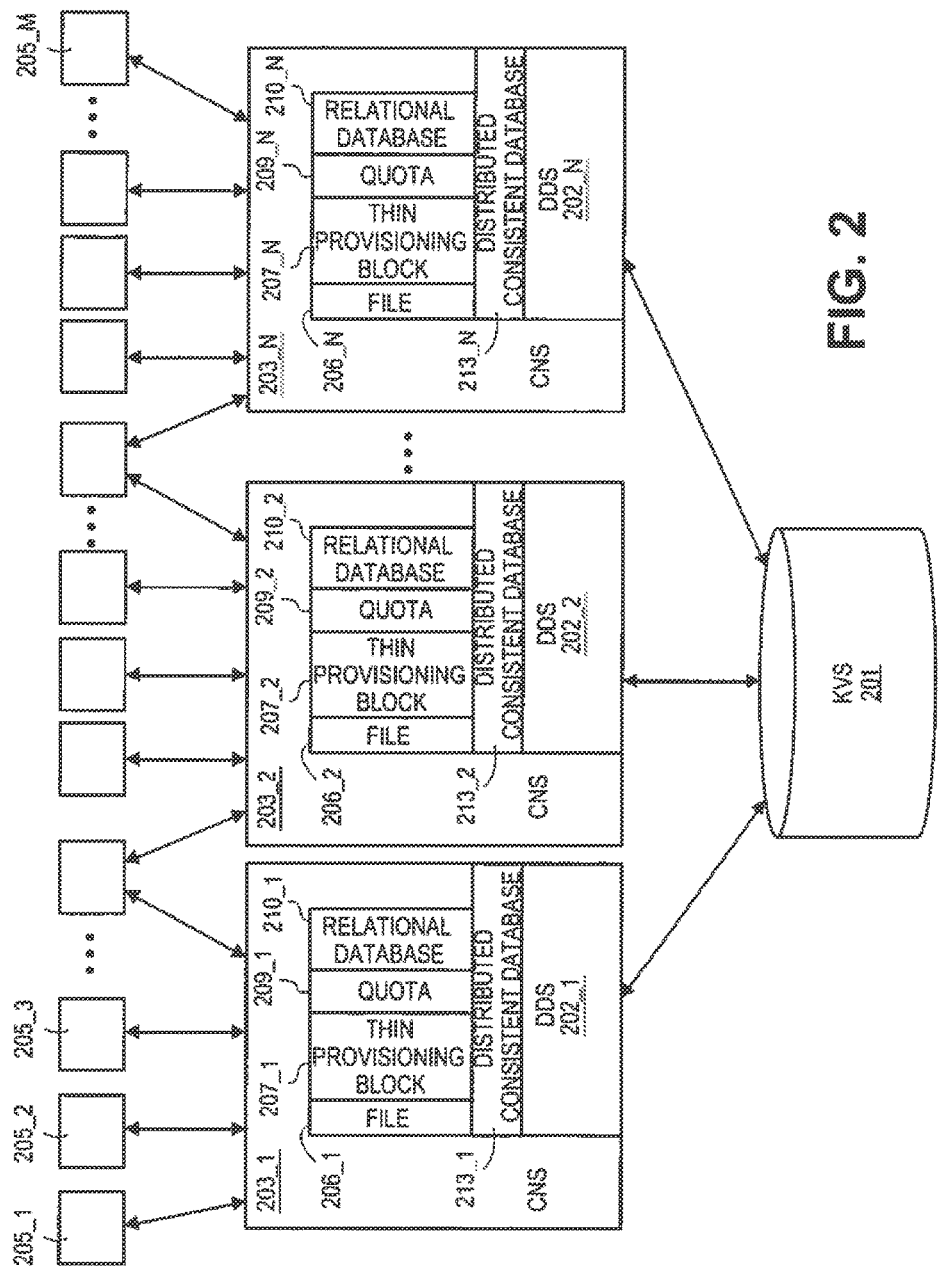
FIG. 2 shows an improved storage technology that provides for quotas, thin provisioning and relational databases with distributed consistent database technology.
Figure 13:
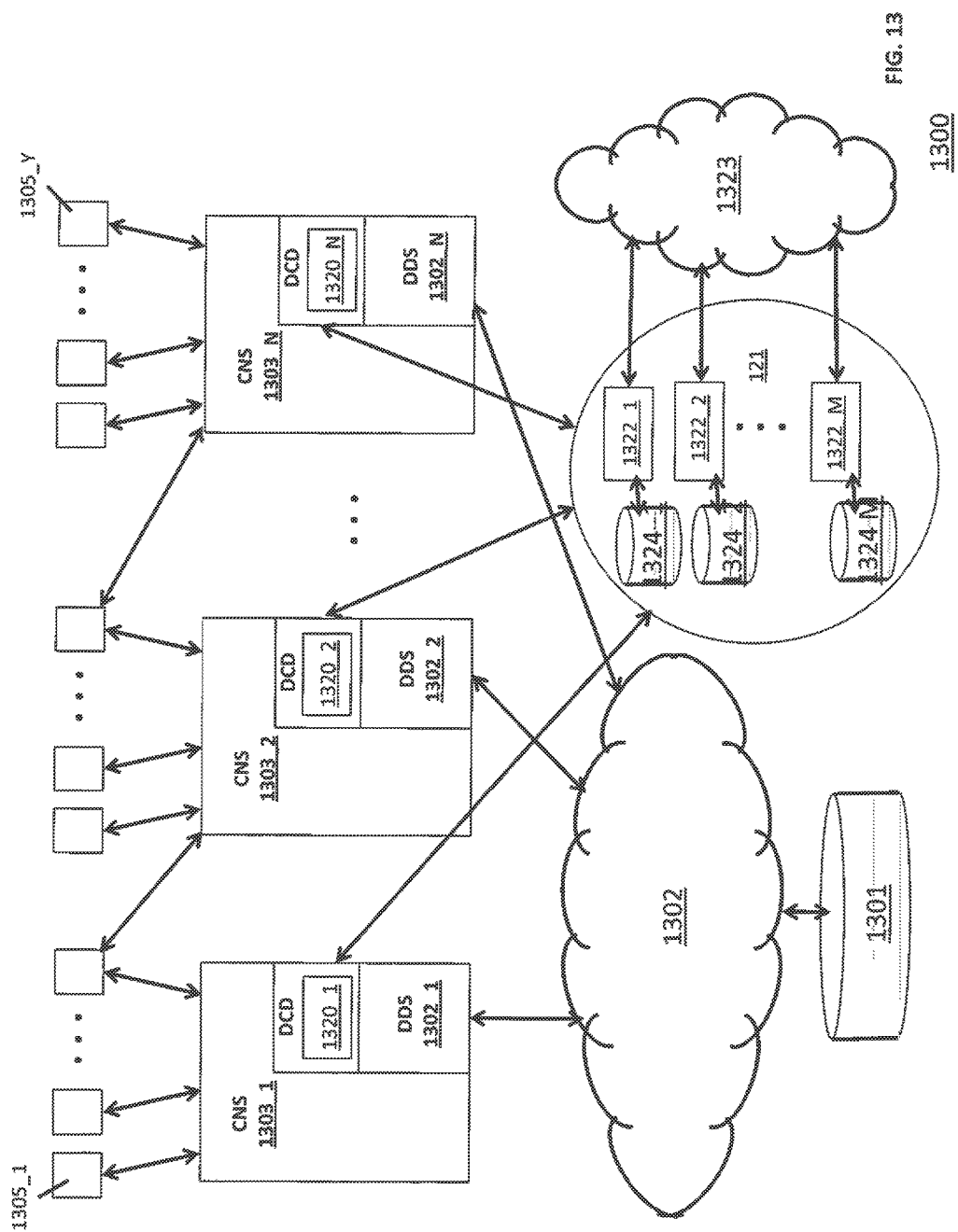
FIG. 13 shows a locking architecture.
Figure 18:
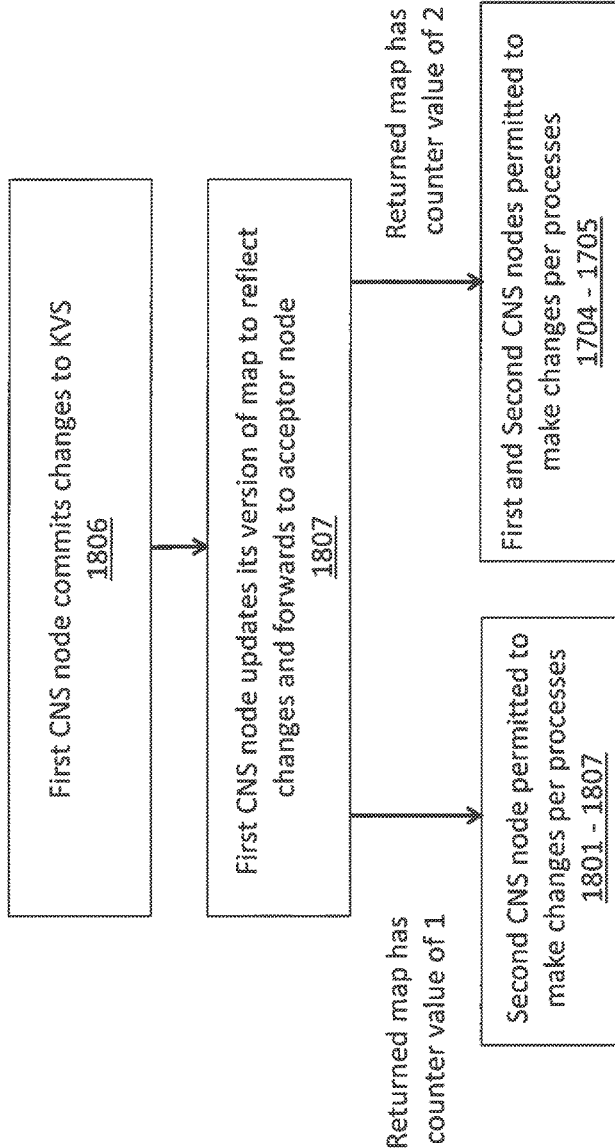
Figure 19:
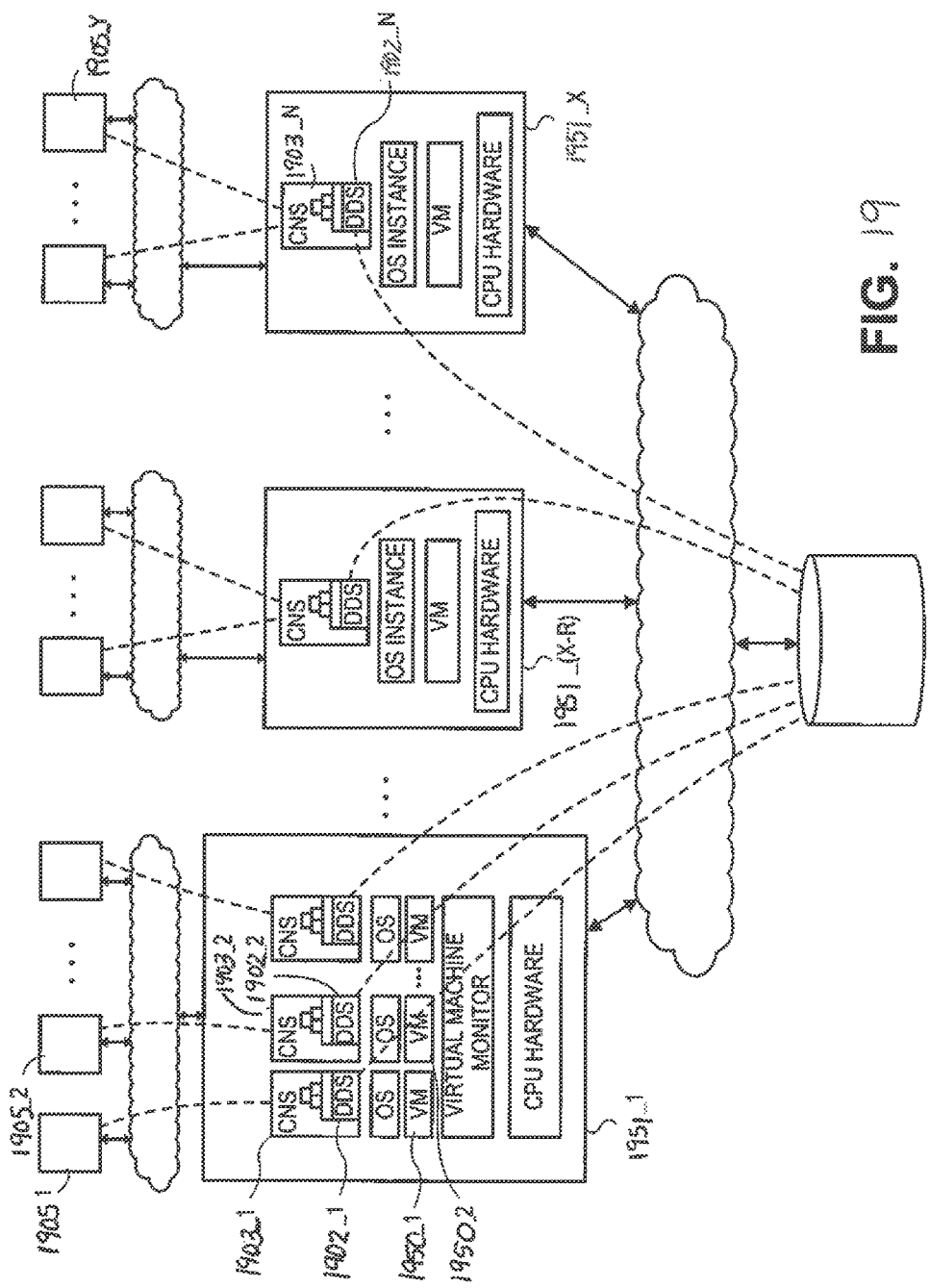
Figure 20:
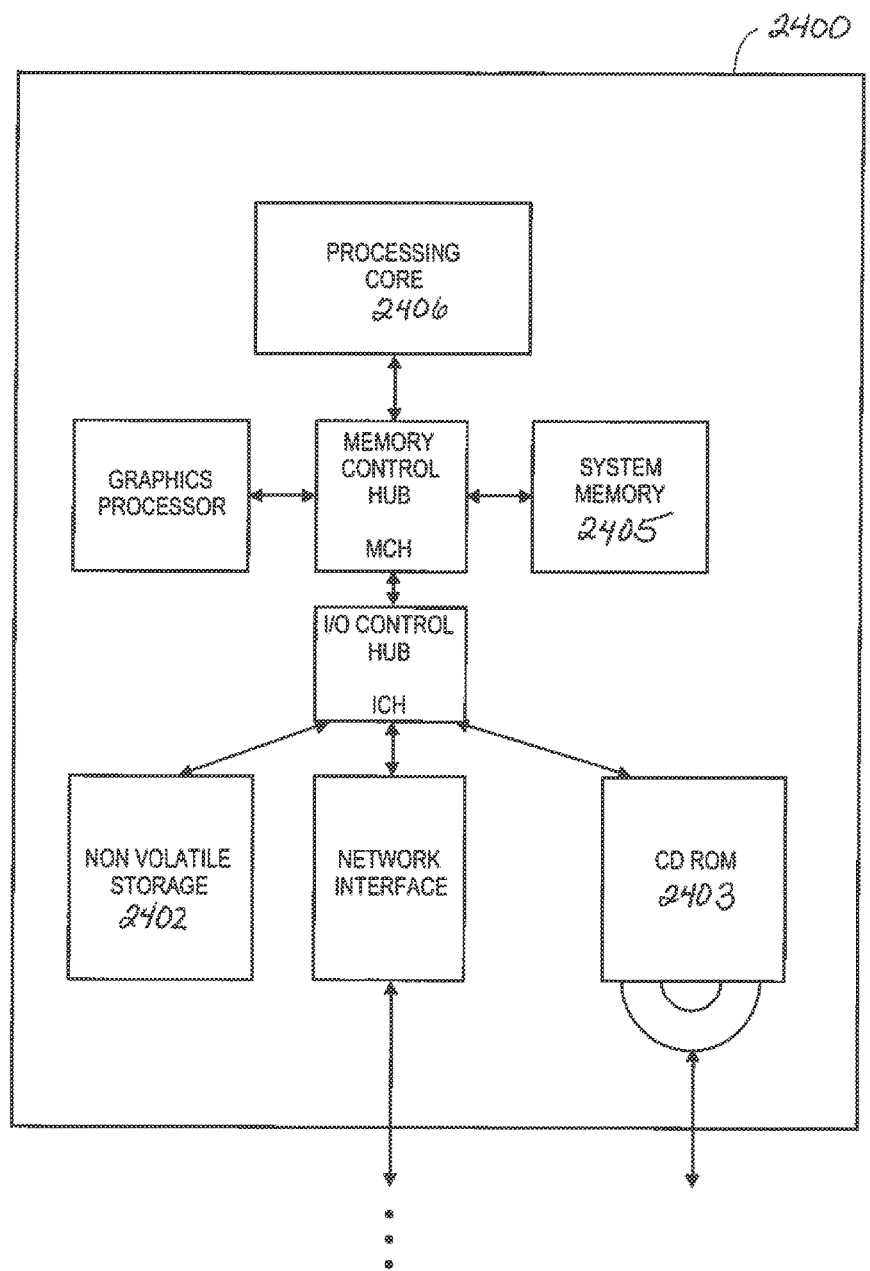

FIG. 15 pertains to an I/O improvement that can be realized with the locking architecture of FIG. 13;

FIG. 16 pertains to another I/O improvement that can be realized with the locking architecture of FIG. 13;

FIG. 17 pertains to a methodology of the I/O improvement of FIG. 16;

FIG. 18 pertains to another methodology of the I/O improvement of FIG. 16;

FIG. 19 is a schematic depiction of various manners in which the architecture of FIG. 2 can actually be implemented in practice;

FIG. 20 shows a computer system.

DETAILED DESCRIPTION 1.0 Overview

FIG. 2 shows an embodiment of a new and versatile storage architecture 200. As observed in FIG. 2, the new architecture includes an object or key value store (KVS) 201, a distributed database management system (DDS) 202 (implemented with separate DDS instances 202_1 through 202_N) and a connectors node system (CNS) 203 (implemented with separate CNS instances 203_1 through 203_N).

At a high level perspective, the KVS 201 can be viewed as the principle storage resource of the system. In various implementations the KVS is implemented as an "object store" that stores "objects". Objects and object stores are well understood in the art. Objects are units of fundamental storage in an object store. Each object is assigned its own unique (e.g., random) identifier that uniquely identifies its corresponding object. This particular type of access is distinguishing from other types of storage systems such as file systems (whose fundamental unit of storage, a "file", is identified with a directory path) and block storage systems (whose fundamental unit of storage, "a block" is identified with a numerically restrictive offset).

Here, as will be discussed at length below, in an embodiment, the KVS 201 is implemented as an object store having a Chord-like distributed hash table access mechanism. The combination of a Chord-like distributed hash table access mechanism with an object store provides for certain advantages for large scale storage systems (principally: intelligent routing resulting in reduced message passing, parallel accessing capability and the ability to keep meta-data along with the stored information).

As described in the background, however, key value store systems employ the use of a key or object ID as the primary mechanism for accessing the data. This means other storage types, such as directory storage or block types of storage, are not natively implemented on the primary KVS storage 201.

The DDS 202 therefore is added as a database management layer above the KVS 201 to provide interfaces 206, 207 of the KVS 201 that permit the KVS 201 to be used as file directory or block based storage system. The file directory interface 206 essentially acts as a translation layer that converts an access specified in the form of a directory into an object ID for the KVS 201. Likewise the block storage interface 207 acts as a translation layer that converts an access specified in the form of an offset (or other type of block specific access) into an object ID for the KVS 201. Practically then, the KVS 201 can be used directly as a key value store or, indirectly as a directory based storage (with a directory interface 206) or indirectly as a block store (with a block interface 207). If the KVS 201 is sufficiently large, one or more of each of these different types of storage systems may be simultaneously implemented.

In an embodiment, both of these interface layers 206, 207 are built with a special mechanism, referred to as an "distributed consistent database", for effectively imposing structure or organization into the KVS 201 Each instance of a distributed consistent database includes a head object for the structure to be imposed. The head object has a mapping table that defines the hierarchy of the structure and its implementation in KVS. In an embodiment, the mapping table: i)

identifies a root page that represents the apex of the hierarchy; ii) identifies the intermediate and leaf pages that reside beneath the root page; iii) maps the "page ID" of the intermediate and leaf pages to specific object IDs within the KVS 201. Leaf pages contain object ID(s) (or information from which object ID(s) can be determined) for the information within KVS that the structure was accessed to obtain.

Individual users can be provided, through interface 213, with their own distributed consistent database instances for their own individual storage. For example, a first user may be provided a first distributed consistent database instance for storage of the first user's content and a second user may be provided with a second distributed consistent database instance for storage of the second user's content, etc. However, multiple distributed consistent database instances can also be coordinated together as fundamental kernels in the construction of a singular, extremely large capacity storage solution. In one approach, a unique distributed consistent database is instantiated at each node of a storage system's hierarchy (e.g., each directory, each sub-directory and each file of a file system) to effect extremely large and easily managed storage resources at each node of the system.

As such, as observed on FIG. 2, the file directory interface 206 uses the distributed consistent database technology 213 to effect extremely large scale file directories, and, the block storage interface 207 uses the distributed consistent database technology 213 to effect extremely large block storage systems.

Moreover, the behavior of the distributed consistent database naturally lends itself to the implementation of "functional bricks" that can run on top of any storage system implemented within the KVS 201. An example of one such functional brick is a quota policy 209. Another functional brick is a relational database 210. The functional bricks 209, 210 and interfaces 206, 207, 213 can be used in various combinations to effect various storage systems.

With the DDS 202 and the CNS 203 a wide range of different storage system interfaces to end-users 205_1 though 205_M. Here, an "end-user" or "user" or "requestor" is any entity that makes use of the storage resources in KVS 201. Examples include an application software instance, an application software process, a client computer instantiated with any one or more of these software instances/processes, an organization such as a corporation, etc.

With direct access to the KVS 201, the CNS 203 is able to provide various object store connectors/interfaces to end-users (e.g., Cloud Data Management Interfaces (CDMI), Simple Storage System (S3), etc.). With access to the file directory interface 206 provided by the DDS 202, the CNS 203 is able to provide any directory file system connector/interface to end-users (e.g., Network File System (NFS), Common Internet File System (CIFS), File System in User Space (FUSE), etc.). Likewise with access to the block storage interface 207 provided by the DDS 202, the CNS 203 is able to provide any block storage system connector/interface to end users (e.g., iSCSI, FC). Again, any/all of these different storage solutions may simultaneously be implemented on the KVS 201 as the actual physical storage resource.

2.0 The KVS System

Figure 3:
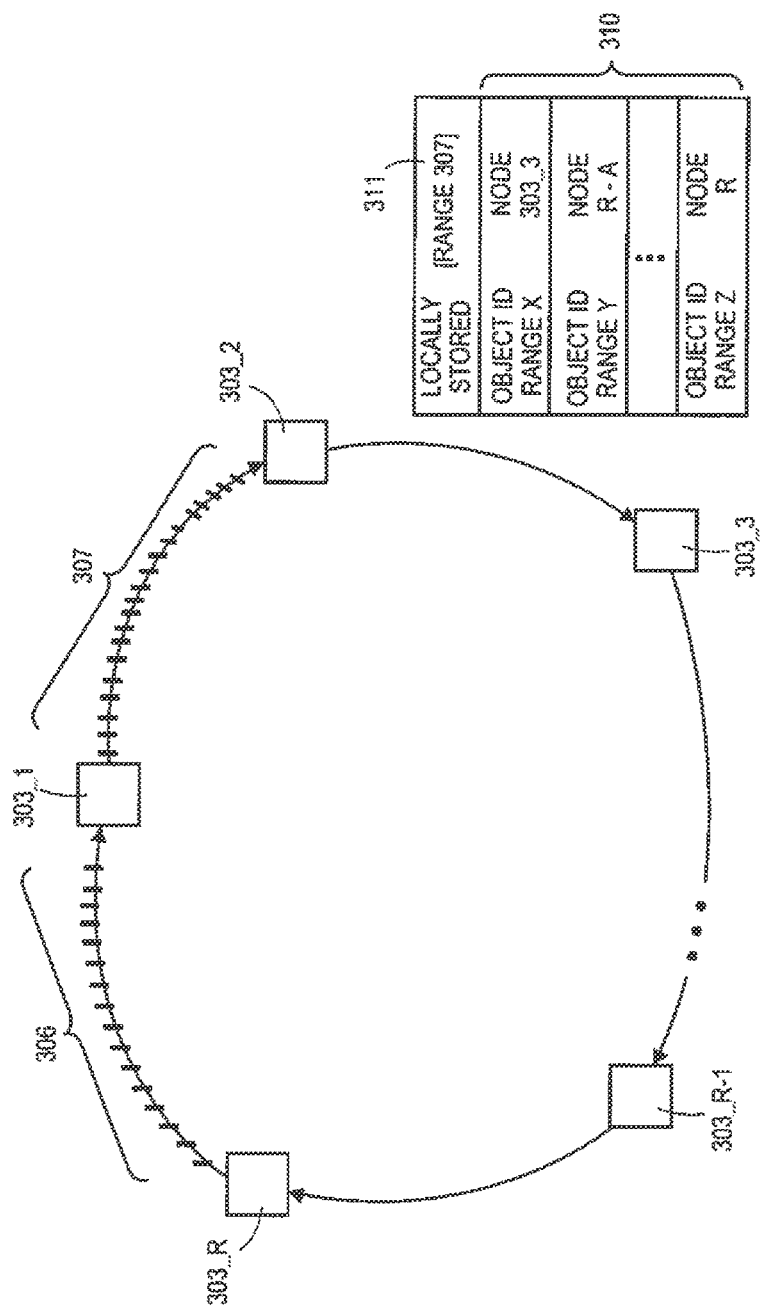
FIG. 3 shows an exemplary KVS layer.

FIG. 3 shows a depiction of an embodiment 301 of the KVS system 201 of FIG. 2. As mentioned above the KVS system 301 can be implemented as an object store having a Chord or Chord-like distributed hash table access mechanism. Such a KVS system 301 can readily be implemented with less expensive disks. Moreover, due to the fact that any of its storage nodes can receive input queries, it essentially has a parallel accessing structure which can be used to diminish any points of contention when writing in parallel and offers good overall parallel I/O performance.

As will be described in more detail below, in an embodiment, the KVS system 201 has the following properties: 1) it is composed of storage nodes; 2) it understands specific verbs to create, read, update and delete data; 3) it manages versions and other system attributes per object; 4) it understands specific verbs to manage reservations which prevent concurrent writers to overwrite an object; 5) it forbids concurrent writing to and reading from the same object; 6) it permits concurrent multiple reads of the same object; 7) it does not require a strong consensus algorithm to operate; 8) the system may have hierarchical levels in which an attempt is made to place objects that are more likely to be accessed in a higher level than objects that are less likely to be accessed (e.g., caching); 9) multiple replicas of a same data object may be stored on different storage nodes to ensure reliability should any particular node go down.

The same keyspace is used for both keys and actual storage nodes where the entirety of the keyspace is envisioned as a logical "ring". Some locations on the ring 303_1 through 303_R correspond to actual storage nodes. Each storage node may receive queries from one or more DDS instances. Remaining ring locations correspond to the respective keyspace IDs or "object IDs" for the data objects that are stored on the storage nodes. Thus, the object ID for a stored data object essentially defines its storage location on the ring.

According to the routing scheme of the system, object IDs are mapped to their successor node. For example, the object IDs within range 306 are mapped to node 303_1, the object IDs within range 307 are mapped to node 303_2, etc.

Each storage node has its own associated routing function, referred to as a finger table. FIG. 3 depicts node 303_2's finger table 311 as an example. Finger table 311 identifies the range 307 of the object IDs 309 whose corresponding objects are stored locally on node 303_2. Node 303_2's finger table 211 also includes routing information 310 that directs a query for any object ID outside its local range 309 to another more appropriate node downstream along the ring. As such, when an object ID is presented to the finger table 311 of node 303_2, the locally stored range 307 information is referred to and the requested data object is immediately returned if it is stored locally on node 303_2. If the object ID is outside node 303_2's object ID range 307 the query is directed further along the ring to a particular node specified in node 303_2's routing information 310.

Generally, the farther a querying object ID is outside a node's local storage range, the farther downstream along the ring the node's routing information will direct the query. The mathematical protocol used in construction of the nodes' respective finger tables ensures that the query will "hit" the node whose local storage range covers the querying object ID within a limited number of routing hops around the ring.

Additionally, through a technique referred to as "replication", a single object ID can be mapped to more than one node along the ring. By so doing, multiple instances of a particular data object are kept at various nodes along the ring thereby ensuring reliability should a node having the data object suffer a failure. When a node does fail, all that needs to be done to reconfigure nodal routing information is to update the failing node's successor to include the failing node's object ID range and update the finger table routing information of the affected nodes along the ring.

According to one approach, referred to as "consistent hashing" each of the nodes along the ring will locally store approximately the same number of object IDs As such complex routing table reconfiguration is not required in the face of a node failure or join.

The object ID for a stored data item may, for instance, be a randomly assigned value or the output of a hashing function. In one implementation, an object ID is assigned for a data item when the data is first presented to the KVS system for storage (e.g., with a CREATE operation). The KVS system may provide the caller of the CREATE operation with the object ID for the data item for subsequent reference to the same data object.

In an implementation, the "object ID" corresponds to entropy information within a larger key structure that is actually used to fetch data along the ring. The larger key structure may include, for example, information appended to the entropy object ID that identifies the number of replicas of the data object within the system as well as which replica the specific key structure corresponds to.

In one embodiment, the individual data items that are stored in the KVS system are embodied as a "chunk" of information having not only the actual data object being stored but also meta-data containing system and/or user defined meta data that is stored along with the actual data object (for simplicity the remainder of the document will refer mainly to a data object). The system meta-data may include, e.g., time of creation of the data object, size of the data object, last access time of the data object, last modification time of the data object and the version number of the data object among other possible characteristics. The user defined meta-data can be any attribute of the data object defined by the user. System meta-data is updated as appropriate when an object is accessed. User meta-data (and even system meta-data) for a particular data object may be returned along with the data object whenever the data is accessed (e.g., for GET and PUT operations).

In an embodiment, the KVS system supports CREATE, PUT, DELETE and GET operations and uses a reservation system to ensure data consistency. Here, RESERVE commands are sent to nodes to effectively place a lock on the data item.

In the case of a CREATE operation, which is used to create a new object, a RESERVE command is initially sent to every node that will be used to store the data object or a replica of the data object. A subsequent CREATE command for the same object is not issued to any such node until an appropriate response is received from each node to which a RESERVE command was sent. In the case of the creation of a new data object, an appropriate response to a RESERVE command includes an indication that the object ID for the new data object is available and there are no competing requests for the same object ID.

In the case of a PUT operation, which is used to update an existing data object, like the CREATE operation, a RESERVE command with a "PUT" intent is initially sent to every node that stores the data object or a replica of the data object. A subsequent PUT command is not issued to any such node until an appropriate response is received from each node to which a RESERVE command was sent. In the case of a PUT operation, an appropriate response to a RESERVE command includes an indication that the specific data object exists and there are no competing PUT, GET or DELETE requests for the same data object. As part of the process of modifying the data object with a PUT command, the version number of the data item's meta-data is incremented commensurate with the writing of the new data.

In the case of DELETE operations, like PUT operations, a RESERVE command is initially sent to every node having the data object or a replica of the data object. Unlike a PUT command, however, a DELETE command is issued to a node that appropriately responds to a RESERVE command as soon as the response to the RESERVE command is received. Here, an appropriate response to a RESERVE command for a DELETE operation includes an indication that the object exists and there are no competing PUT or GET requests for the same object.

In the case of GET operations, a RESERVE command with "GET" intent is sent to every node having the data object. If the RESERVE command is responded to favorably (which indicates that the data object exists and there are no competing PUT or DELETE requests for the same object), the data item is returned to the caller. Here, the fastest replica with the highest version number is chosen for the GET operation (otherwise the operation fails and is retried later).

In a further implementation, the KVS system may be enhanced to include one or more supervisory nodes (not depicted in FIG. 2) that are communicatively coupled to the storage nodes of the ring. The supervisory node(s) execute processes that: 1) formally join new nodes to the ring; 2) formally delete existing nodes from the ring; 3) monitor the ranges of object IDs stored on each node; 4) detects incorrect storage of object IDs on a particular node (e.g., a node is storing successor object IDs); and, 5) resolves any such incorrect object ID storage.

In another further implementation, the KVS system has multiple storage tiers (also not shown in FIG. 2). For example, a first ring is used as a caching layer (tier 1) and a second ring is used as a deeper storage later (tier 2). Here, accesses to the tier 1 layer are generally completed sooner than accesses to the tier 2 layer. A probabilistic offload engine determines which data objects warrant storage in the tier 1 layer (e.g., objects deemed more likely to be accessed in the immediate time frame are identified for storage in the tier 1 layer). Various semantics between the caching and deeper layers may be exercised (e.g., write through, copy-on-write, etc.) to ensure data reliability and consistency.

More details pertaining to an implementation of a KVS system may be found in U.S. application Ser. No. 12/640, 373 filed on Dec. 17, 2009 entitled "Multipurpose Storage System Based Upon A Distributed Hashing Mechanism With Transactional Support and Failover Capability" and issued as U.S. Pat. No. 842,944 and U.S. application Ser. No. 12/964,656 filed on Dec. 9, 2010 and entitled "Probabilistic Offload Engine For Distributed Hierarchical Object Storage Devices" both of which are hereby incorporated by reference in their entirety into the instant application.

3.0 The DDS Database Management System (the Distributed Consistent Database and Uses of the Distributed Consistent Database)

Referring to FIG. 2, the distributed database management system (DDS) 202 is used to help realize different kinds of structures that can be implemented within the KVS 201. Specifically, as discussed with respect to FIG. 2, the KVS system dictates the use of a key (object ID) to a caller of the KVS system 201. As such, in order to implement directory based storage systems and/or block based storage systems in KVS, the DDS 202, in an embodiment, offers both a directory interface 206 and a block storage interface 207.

As discussed above, the directory and block storage interfaces 206, 207 rely on an underlying structural kernel imposed into KVS, referred to as a distributed consistent database 213, that permits for extremely large storage systems. Distributed consistent database instances may also be exposed for direct use. Additionally, distributed consistent databases can be used to implement other functions or applications on top of any of the storage systems implemented within KVS 201. Examples include quotas 208 and relational database functions 210.

3.1 The Distributed Consistent Database—Structure and Overview

Figure 4:
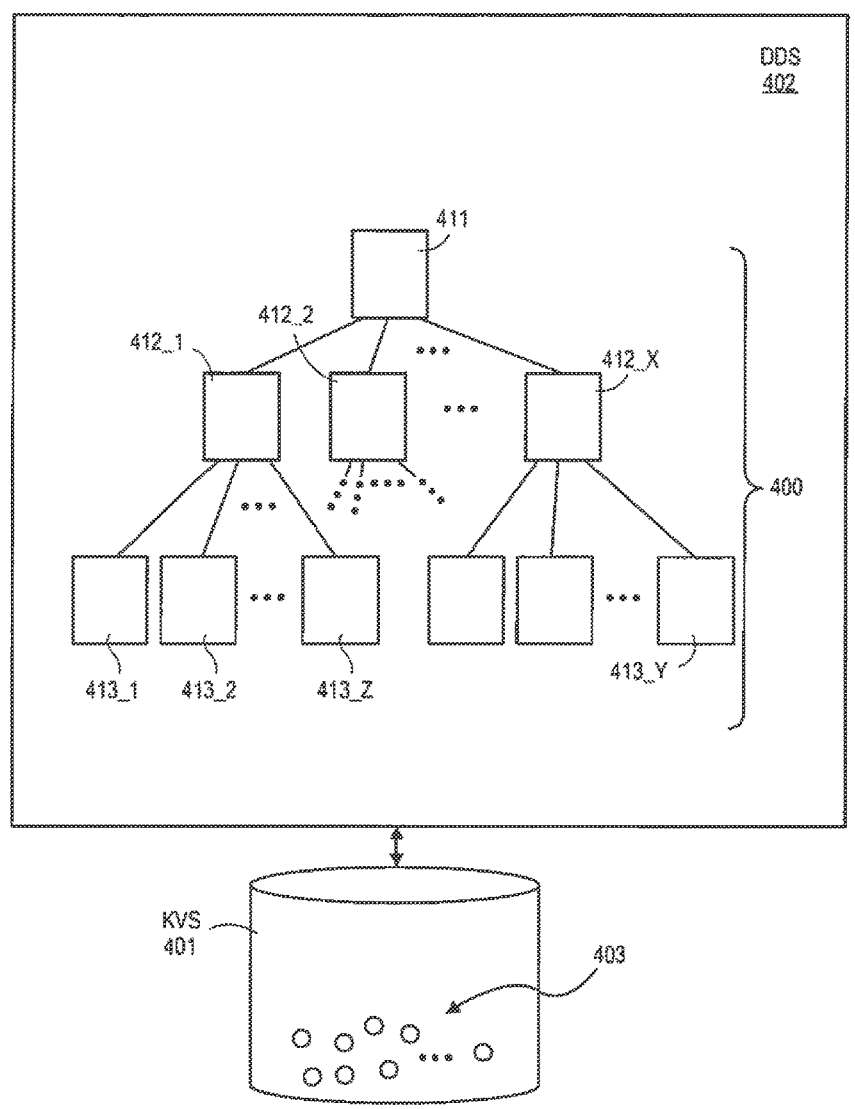
FIG. 4 shows a distributed consistent database.

FIG. 4 shows an instance of a distributed consistent database. Referring to FIG. 4, a distributed consistent database includes a hierarchy of pages 400 that are managed within a DDS instance 402. The hierarchy of pages 400 are used to navigate accesses for a collection of objects 403 within KVS 401 that the distributed consistent database is the keeper of. Thus, objects 403 typically correspond to objects containing information of the "user" ("customer information") while the hierarchy of pages 400 is used to correctly identify which of objects 403 have been targeted by any particular request made to the distributed consistent database.

In an implementation, as will be described more completely below, each page of the hierarchy 400 is kept within its own object in KVS 402. Objects containing hierarchy pages are called into DDS 402 from KVS 401, e.g., "one at a time", as their corresponding pages are actually needed (objects whose pages "might be" needed may also be called up in advance).

In an embodiment, a page is understood to be a collection of information that can be switched into memory and switched out of memory as a unit by a software program that operates on the page's information. As is known in the art, one or more pages of information are called into memory by a software program, where, there is typically some limit on the size of the pages and/or the number of pages that can be called into memory by the software program. In operation, to effect efficient use of memory, a software program will call into memory the pages it needs or believes it might need and switches out of memory the pages it does not need or believes it does not need.

In practice, each "page" may be implemented as a document (e.g., an XML document, JSON document or binary representation) or other construct that can be contained within an object store object and keep the hierarchical and/or navigational logic of the access hierarchy scheme.

Thus, in an implementation, the corpus of hierarchical pages 400 observed in FIG. 4 for an entire distributed consistent database are typically not all resident within DDS 402 at any instant of time. Rather, only a subset of these pages 400 are eventually called up from KVS 401 to satisfy any particular request. The hierarchy of pages 400 can easily "expand", however, akin to the behavior of a B+ tree, to accommodate extremely large numbers of objects 403 that the distributed consistent database is used to store.

As observed in FIG. 4, the hierarchy of pages 400 include a root page 411, various intermediate pages 412_1 through 412_X and various leaf pages 413_1 through 413_Y. Although only one level of intermediate pages 412 is depicted, a distributed consistent database may have multiple levels of intermediate pages. Each of the root page 411 and the intermediate pages 412_1 through 412_Y include the page IDs of their immediately lower pages. For example, root page 411 includes the page IDs for each of intermediate pages 412_1 through 412_Y, intermediate page 412_1 includes the page IDs for leaf pages 413_1 through 413_Z, etc. Each page may also include some form of logic and/or information to be processed by such logic (e.g., within DDS software) that determines which is the appropriate next lower page for any particular request. For example, if a particular request targets an object within objects 403 whose object ID is kept on leaf page 413_1, the logic of root page 411, in view of the request, will produce the PAGE ID for intermediate page 412_1, and, likewise, the logic of intermediate page 412_1 will produce the PAGE ID of leaf page 413_1.

In this manner, any particular request is resolved to the correct leaf page. A leaf page contains one or more object IDs or other references for the objects 403 within KVS 401 that are kept by the distributed consistent database. For example, in the case of a simple read request, when the read request is applied to the correct leaf page, the leaf page provides the object ID or other identifier for the specific object in KVS that has been requested.

3.2 The Distributed Consistent Database—Basic Access

Figure 5A:
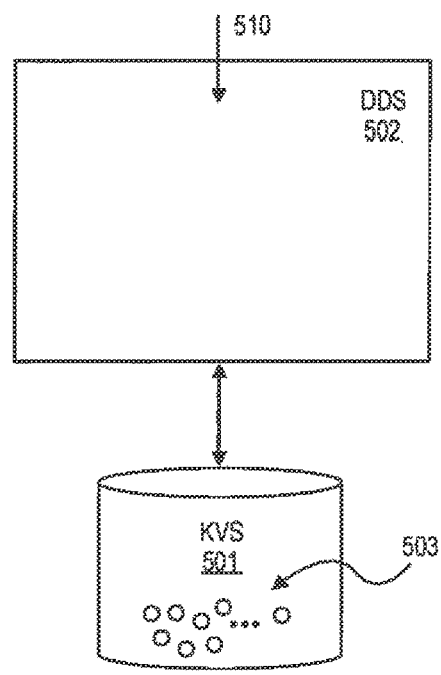
FIGS. 5a-5d show basic access behavior for a distributed consistent database.
Figure 5B:
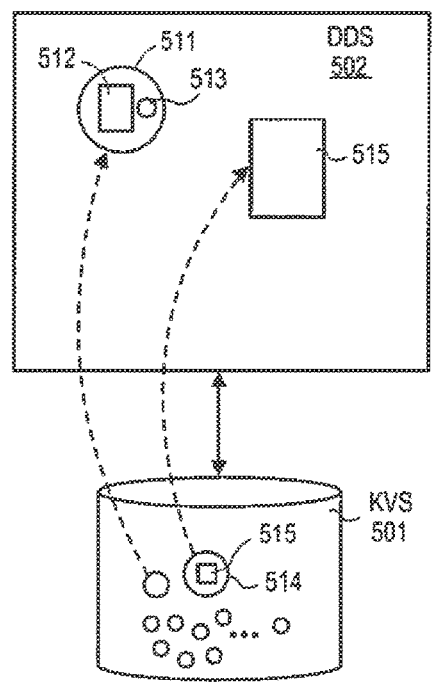
Figure 5C:
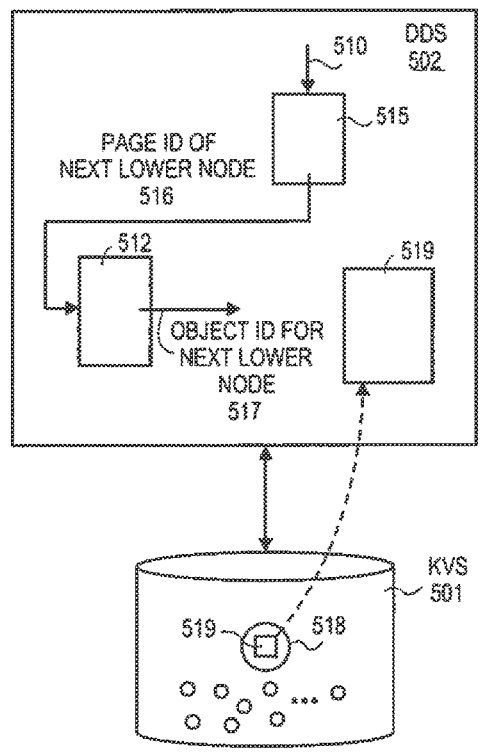
Figure 5D:
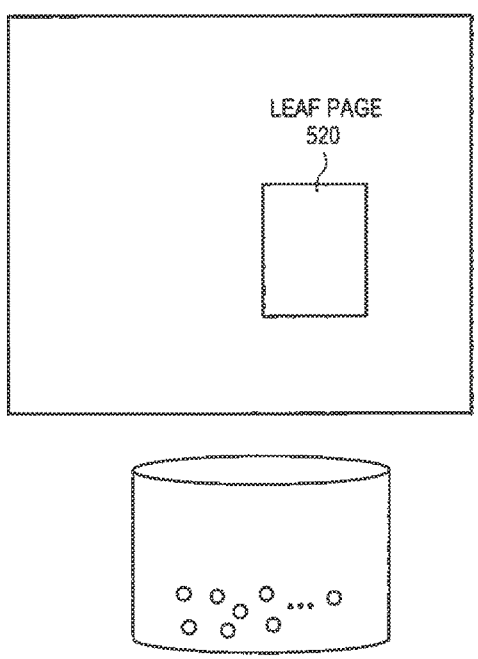
Figure 6:
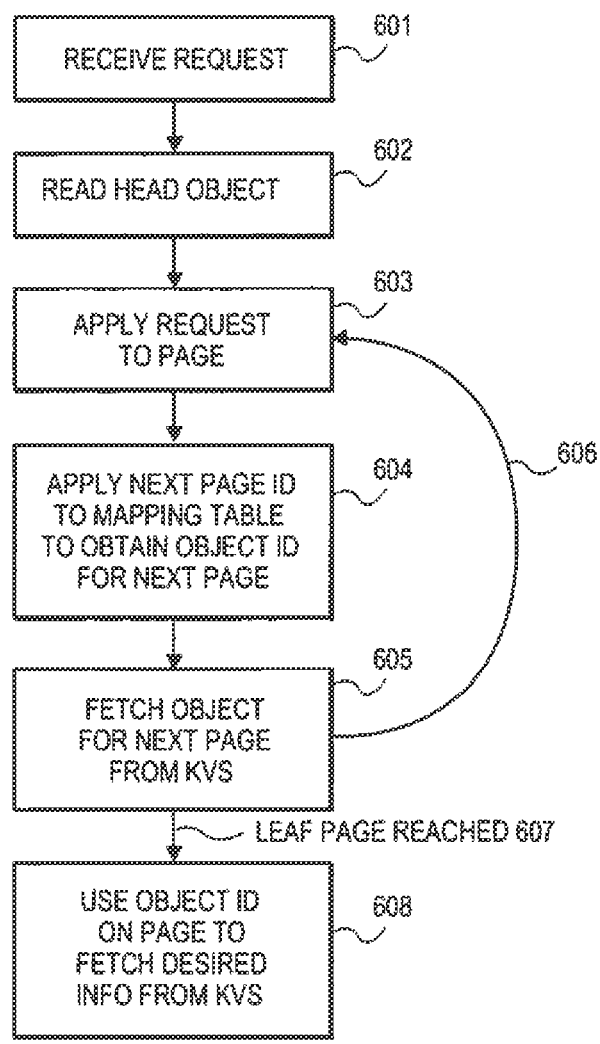
FIG. 6 shows a methodology that outlines the basic access behavior of a distributed consistent database.

FIGS. 5a-5d show basic access behavior for a distributed consistent database and FIG. 6 shows a methodology that outlines the basic access behavior.

Referring to FIG. 5a and FIG. 6, a request 510 is received that identifies a particular distributed consistent database and an action to be performed on that distributed consistent database 601. The request 510 may be generated externally from DDS 502 (e.g., in the case where the distributed consistent database is exposed for direct use) or internally within DDS 502 (e.g., in the case where a larger database solution offered by DDS is invoking the distributed consistent database). Actions to be performed on a distributed consistent database typically include any of: 1) the fetching of one or more objects 503 from within KVS 501 that the distributed consistent database is configured to keep; 2) the addition into KVS 501 of one or more objects into the group of objects 503 that the distributed consistent database is configured to keep; or, 3) the deletion from KVS 501 of one or more objects from the group of objects 503 within KVS 501 that the distributed consistent database is configured to keep.

In response to the request 510, referring to FIGS. 5b and 6, the DDS 502 reads 602 from KVS 501 a "head" object 511 for the specific distributed consistent database that is targeted by the request 510. In an implementation, the head object 511 for the distributed consistent database targeted by the request is identified in the request itself 510 or is readily identifiable from the request itself (e.g., the object ID is calculated from the request through some mathematical operation). Alternatively, the DDS 502 may keep a repository that tracks the head object IDs for all the distributed consistent databases it has instantiated in KVS 501.

The head object 511 contains a mapping table 512 and the object ID 513 for the object 514 within KVS 501 that contains the root page 515 for the distributed consistent database. As will be made more apparent in the following discussion, the mapping table 512 is a data structure that correlates the PAGE ID of the intermediate and leaf node pages of the distributed consistent database's hierarchy to its corresponding KVS object ID. The root page 515, corresponds to root page 411 of FIG. 4 and represents the root (highest level) node in the hierarchy of the distributed consistent database. The object ID 513 for the root page 515 found in the head object 511 is used to initially fetch 602 the root page 515 from KVS 501.

The information on the root page 515 identifies, via "page IDs", the immediately lower nodes of the distributed consistent database's hierarchy that stem from directly beneath the root page. The root page 515 also contains logic (or information to be used by such logic within the DDS software) for determining which of these page IDs is the correct page ID for the next lower node of the distributed consistent database's hierarchy in view of the request being processed.

Referring to FIG. 5c and FIG. 6, the request 510 is applied to the root page 515 which provides the page ID 516 for the next lower node in the distributed consistent database's hierarchy that is appropriate to satisfy the request 603. The next lower page ID 516, in turn, is provided to the mapping table 512 which provides 604 the object ID 517 for the object 518 in KVS 501 that contains the next lower page 519. The object 518 containing the next lower page 519 is fetched 605 from KVS 501 and the process repeats 606 until a leaf page is reached 607 in the distributed consistent database's hierarchy.

For ease of drawing FIG. 5d depicts a leaf page 520 being reached immediately after the first intermediate page 519. Note that only three pages have been called up from KVS to reach the leaf page 520 whereas the distributed consistent database's hierarchy of pages may be much larger than that (e.g., many more intermediate pages and leaf pages may exist).

In an embodiment, object ID(s) for requested information are found directly within a leaf page (i.e., the mapping table is not used). For example, in the case of directory request "/C/RED/BLUE/FILE", the object ID for FILE will be found in the leaf page that is called up from KVS of the distributed consistent database dedicated to the folder BLUE. The object ID is then applied directly to KVS to fetch the requested information 608. Here, the object ID for the head object for the distributed consistent database representing folder BLUE is referenced on a leaf page of a distributed consistent database representing folder RED. The object ID for the head object for the distributed consistent database representing folder RED will be referenced on a leaf page of a distributed consistent database representing root directory C. In an implementation, a distributed consistent database representing a root directory has a fixed object ID.

Although the embodiments described herein mainly contemplate an implementation where only one page is kept in an object containing a hierarchical page, it is conceivable that multiple hierarchical pages may be kept in single object.

3.3 The Distributed Consistent Database—Implementation of Changes

FIGS. 7a-7e show distributed consistent database behavior when changes are made to the distributed consistent database. FIG. 8 shows a methodology outlining such behavior.

The contents of a distributed consistent database are often not static. The hierarchy of a distributed consistent database can behave much like a B− tree in the face of changes. For instance, if a large number of objects is added to the distributed consistent database for storage, the number of intermediate and/or leaf pages in the hierarchy may expand outward. Likewise, if a number of objects kept by the distributed consistent database are deleted, content of multiple pages may be merged onto a single page with one or more of the other pages being deleted. Thus, the "shape and size" of a distributed consistent database's page hierarchy may expand and contract in response to the addition and deletion of objects that are stored in the distributed consistent database. Moreover, changes to pages should have limited ripple effects to other pages. For instance, if a leaf page is deleted, the deletion needs to be accounted for in the intermediate page that references the deleted leaf page but no other page needs to be modified.

A practical difficulty is that, as discussed above with respect to FIG. 2, the overall framework is intended to have the capability to scale to large values of N (number of DDS instances) and/or M (number of users). As such, it is possible that one or more other DDS instances and/or users may be simultaneously accessing the same distributed consistent database. In an implementation, there is no limit placed on how many reads may be made from KVS for the head object for a particular distributed consistent database. As such, anytime a particular user or DDS instance intends to impose a change to a distributed consistent database there is the potential that a large number of other DDS instances and/or users are using the distributed consistent database and intend to make their own changes as well. Some of these changes may even compete with the changes desired by the particular user or DDS instance.

In an implementation this problem is dealt with by making the objects of a distributed consistent database other than its head object immutable (that is, they cannot be modified), and, using an ACID transactional process on KVS to effect any desired changes to the distributed consistent database. Here, in embodiment, objects containing intermediate pages, objects containing leaf pages, and the customer data objects referred to by the leaf pages are all made immutable.

Figure 7A:
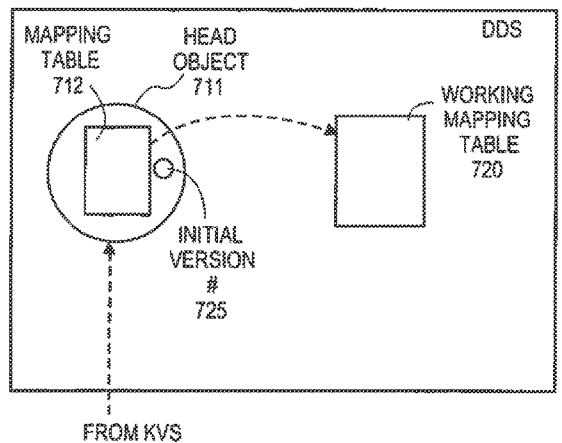
FIGS. 7a-7e show distributed consistent database behavior when changes are made to the distributed consistent database.
Figure 8:
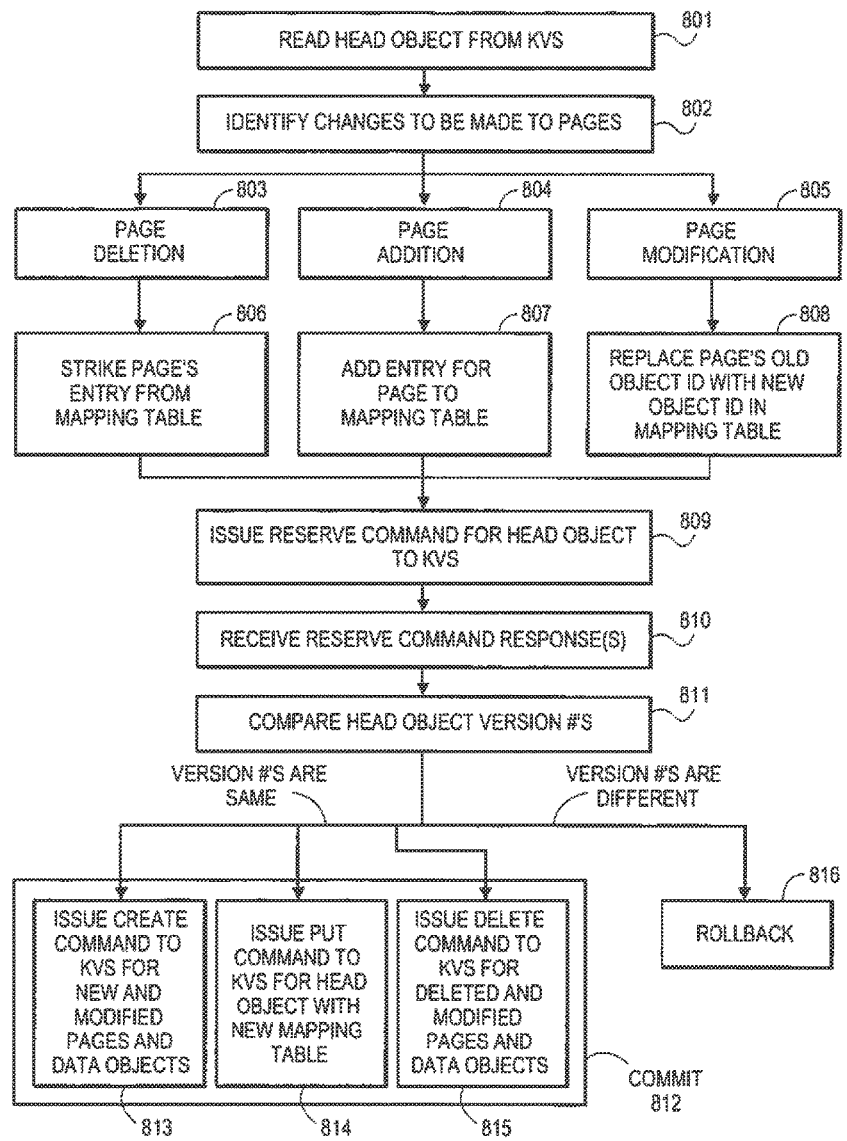
FIG. 8 shows a methodology outlining the behavior of a distributed consistent database when changes are made to the distributed consistent database.

As observed in FIGS. 7a and 8, in an embodiment, when the head object 711 for a structure is first read 801 from KVS a "working" mapping table 720 is created from the mapping table 712 contained within the head object 711. Initially the working mapping table 720 is just a copy of the mapping table 712 that is found in the head object 711. In an implementation, the head object 711 also contains meta-data 725 that tracks versioning for the head object 711. The use of the working mapping table 720 and the version number for the head object 711 will become more apparent in the following discussion.

The distributed consistent database is then accessed consistent with the methodology of FIG. 6 and the specifics of the request. The access may entail deletions of and/or additions to the customer data objects kept by the distributed consistent database. Such changes may cause changes to the content of the intermediate and/or leaf pages of the distributed consistent database's hierarchy, and/or, may change the number of intermediate and/or leaf pages. In the case of customer objects to be deleted, one or more leaf pages will have to be amended to delete any reference to their object IDs. In the case of newly created customer objects, certain leaf pages will have to be amended (and/or added) to include references to their object IDs. The specific pages that are impacted by any such changes are identified and called up from KVS 802 (if not already called up by way of the prior access). For ease of drawing, FIGS. 7a-7e do not show any of the hierarchy pages.

As observed in FIG. 8, there are three basic kinds of changes that can be made to the pages that are impacted by the structural change: 1) the deletion of a page 803; 2) the addition of page 804; and, 3) the modification of a page 805. Any number and combination of these changes may result from any combination of additions and deletions to the set of customer objects kept by the distributed consistent database.

Figure 7B:
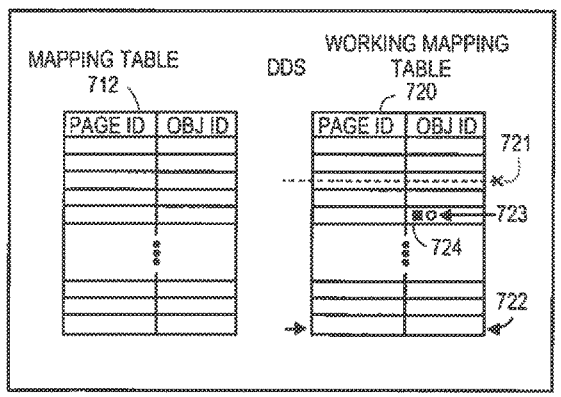

Referring to FIG. 7b and FIG. 8, if a page is to be deleted 803, its entry 721 is stricken 806 from the working mapping table 720. If a page is to be added 804, a new entry 722 having a new page ID and corresponding object ID for the new page is added 807 to the working mapping table 720. If a page is to be modified 805, the change is made to the page (which can be a change, deletion and/or addition upon the page's information), a new object ID 723 for the page is created and entered to the working mapping table 720 (the modified page keeps its page ID), and, the old object ID 724 for the page is stricken 808 from the working mapping table 720 (the old object containing the old page will be deleted from KVS). Note that process 808 essentially accounts for the characteristic that KVS objects containing pages are immutable. Here, permitting a modified page to keep its page ID dampens the "ripple up" of changes upward in the page hierarchy that would otherwise need to be made if a new page ID were used.

Figure 7C:
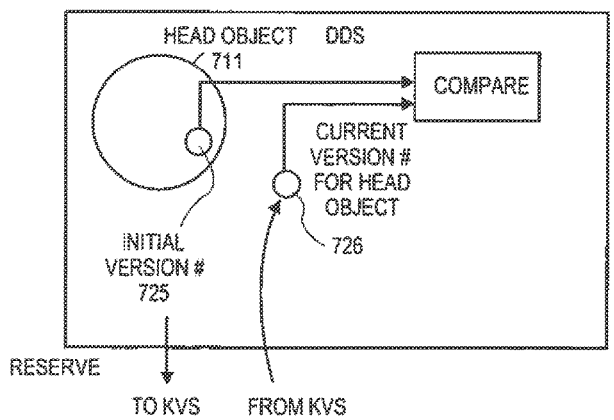
Figure 7D:
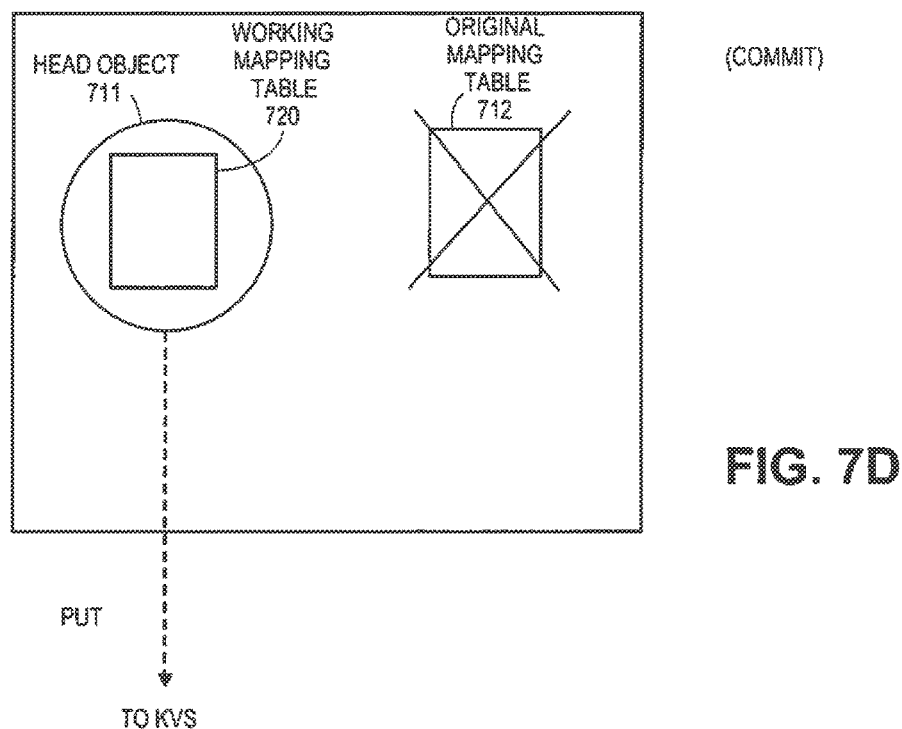

The head object 711, however, is not immutable and the DDS instance, referring to FIGS. 7c and 8, initiates a PUT operation to KVS to essentially incorporate the updated working mapping table 720 into the head object 711 rather than the original mapping table 712 that was found in the head object 711 when it was first read from KVS (at process 801). Recall that in the case of a PUT operation, a RESERVE command is initially sent 809 to every KVS node that stores the object or a replica of the object. A subsequent PUT command 813 is not issued to any such node until an appropriate response is received from each node to which a RESERVE command was sent 810.

In the case of a PUT operation, an appropriate response to a RESERVE command 809 includes the object's meta data with current version number 726, and, an indication that the specific object exists and there are no competing PUT, GET or DELETE requests for the same object. Receipt of the appropriate response from all KVS nodes having the head object or its replica confirms that the RESERVE command has locked the head object.

The current meta-data version number 726 for the head object 711 that is received in response to the RESERVE command is compared 811 with the version number 725 for the head object 711 when the head object 711 was first read from KVS 801. If the version number has not changed since the initial reading 801 of the head object 711 (i.e., the current version number 726 for the head object included in the RESERVE responses is the same as the version number 725 for the head object as of the initial read of the head object 801) there were no changes made to the distributed consistent database since the initial access 801 of the head object and the changes are committed 812.

Referring to 7d and FIG. 8, the changes are committed 812 by: 1) issuing one or more CREATE commands 813 into KVS for one or more new objects for any new pages, modified existing pages, new customer objects or effectively modified pre-existing customer objects; 2) issuing a PUT command 814 to KVS for the head object 711 including the working mapping table 720; 3) issuing one or more DELETE commands 815 for one or more objects to be deleted corresponding to deleted pages, earlier versions of modified pages or earlier versions of modified customer data objects. In an embodiment, at least processes 813 and 814 are executed serially in order.

As alluded to above, the one or more CREATE commands store data objects into KVS for any new customer data objects to be added to the group of objects 403 kept by the distributed consistent database. These include both entirely new items of data and modified versions of previously existing data (the later reflecting the immutable nature of the customer data objects). The object IDs for the newly created objects may be randomly chosen. The one or more DELETE commands are also used to delete from KVS any customer data objects to deleted from the group of objects kept by the distributed consistent database. These include both previously existing items of data that have been deleted outright and previously existing items of data that have been modified (the later again reflecting the immutable nature of the customer data objects).

Figure 7E:
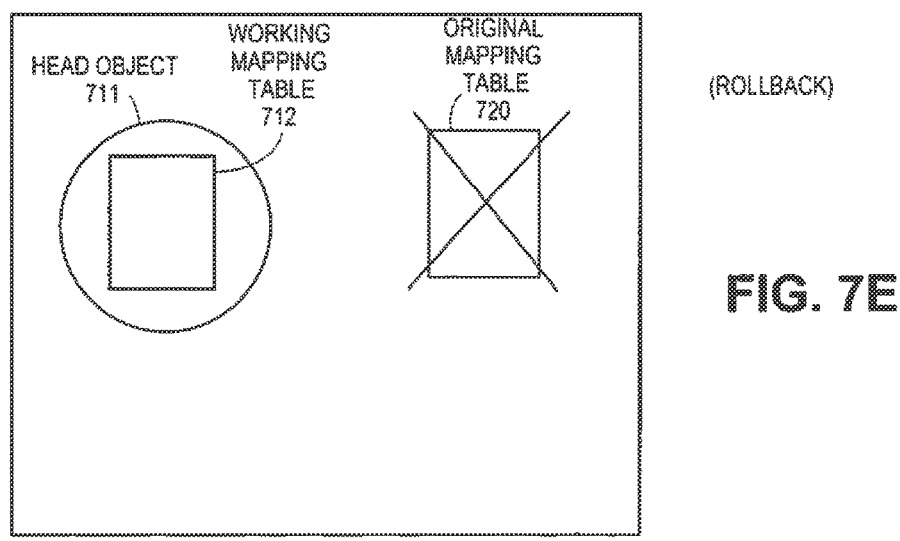

Referring to FIG. 7e and FIG. 8, if the version number has changed, the changes to be made to the distributed consistent database's hierarchy are rolled back 816 by: 1) not following through with a PUT command on the head object (as such, the version number for the head object is not incremented and the original mapping table is maintained); 2) discarding the working mapping table 720; and, 3) discarding any newly created pages (which effectively discards modified as well as actually new pages).

Note that the use of the RESERVE command for PUT operations corresponds to an optimistic locking system when the potential for multiple concurrently existing instances of the same DDS structure is considered. The number of such instances can be very large.

It is important to point out that although the KVS solution described above in Section 2.0 was presented as the underlying KVS in the discussion of the distributed consistent database provided just described above in Sections 3.0, 3.1, 3.2 and 3.3, such a presentation was only for exemplary purposes. Other embodiments that implement distributed consistent database technology may use KVS technologies other than the particular KVS solution described above in Section 2.0. Here, at least, any KVS system that implements reservations and versioning akin to processes 809-811 of FIG. 8 may be used to implement distributed consistent database technology (safety and liveness may be additionally guaranteed).

3.4 Uses of the Distributed Consistent Database to Implement Large Scale Storage Systems The generic access system discussed above has a number of different uses for effectively extending the range of KVS beyond a basic object store. These include directory and thin provisioned file storage systems. A discussion of each of these is provided immediately below.

i) Directory File Storage Systems

Figure 9:
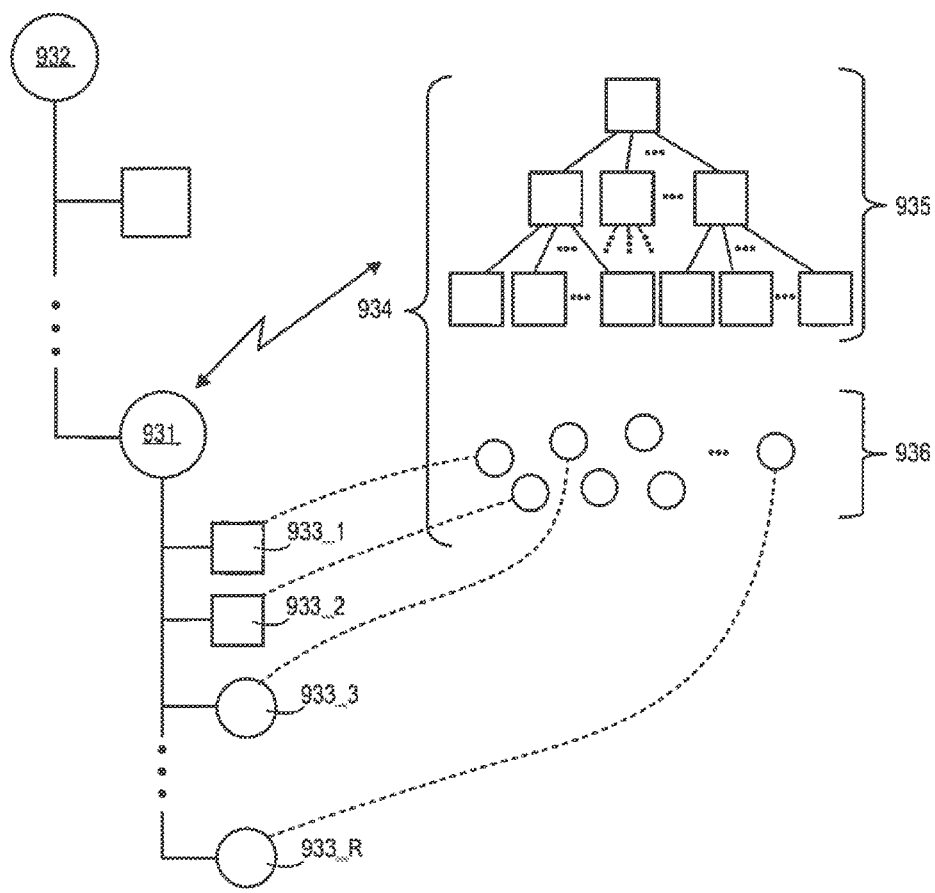
FIG. 9 depicts an exemplary use of a distributed consistent database to implement a file directory.

FIG. 9 depicts an exemplary use of the distributed consistent database to implement the file directory interface 206 of FIG. 2. As is known in the art, a specific file is targeted in a file directory system by specifying a pathway of sub-directories/folders through the directory's hierarchy (e.g., "/RED/BLUE/GOLD/FILE"). FIG. 9 depicts a segment 930 of a file directory's hierarchy. Here, a single sub-directory/folder 931 is shown. The sub-directory's parent directory 932 is shown as is its children sub-directories and files 933_1 through 933_R. A "root node" head object represents the entire file system directory and paths to all sub-directories and files flow from the root node.

In an implementation, every "node" in the file system in implemented as a distributed consistent database having its own head object, etc. Thus, parent directory 932 is implemented as a first distributed consistent database instance, sub-directory 931 is implemented as a second distributed consistent database instance and each of the children sub-directories and files 933_1 through 933_R are implemented as their own individual distributed consistent database instances.

FIG. 9 shows a representation 934 of the distributed consistent database used to implement sub-directory 931. Consistent with the discussions provided above, the distributed consistent database includes a hierarchy of pages 935 and a group of objects 936 that are kept by the distributed consistent database. For any given access to the distributed consistent database, the hierarchy of pages 935 are navigated through in piece-meal fashion to reach a specific one or more objects from the group of objects 936 kept by the distributed consistent database.

Here, the group of objects 936 kept by the distributed consistent database correspond to the children sub-directories and files 933_1 through 933_R within the sub-directory 931. Each of these objects 936 are also implemented as head object (each child sub-directory and file is implemented as its own distributed consistent database). The hierarchy of pages 934 permits for easy/efficient access of any targeted child sub-directory or file should R become extremely large.

A targeted file is reached anywhere in a file system directory by "hopping" through a chain of distributed consistent databases representing the directory/sub-directory path of the request until the desired "file" is reached (which is also implemented as a distributed consistent database). The content of the hierarchy of pages is designed to guide the navigation progression through the pages consistent the request which specifies a file directory path.

For example, for any access that "flows" through sub-directory 931, the head object for the parent directory 932 will be called up from KVS, its hierarchy of pages will be navigated through piece-meal until a leaf page that identifies the head object for sub-directory 931 is reached. The head object for sub-directory 931 will then be called up from KVS and its hierarchy of pages 935 will be navigated through until a leaf page is reached that identifies the head object of the next sub-directory that is impacted by the request. The process continues until the targeted file is reached. If the file targeted by the request is contained by sub-directory 931 a leaf page will be reached in hierarchy 935 that identifies the head object for the targeted file.

Changes to the file system are made consistently with the discussion above in FIGS. 7a-7e and FIG. 8.

If any files or sub-directories 933_1 through 933_R within sub-directory 931 are to be deleted, their corresponding head objects are marked for deletion from KVS and the hierarchy of pages 935 are modified to no longer refer to the object IDs of these sub-directories/files. The hierarchy of pages 935 are modified at least by removing the object IDs of the deleted sub-directories/files from any leaf pages of the hierarchy 935. This may include effective page modification, entire page deletion or both.

For example, deletion of a large number of sub-directory/file objects may cause two leaf pages to merge. This causes modification to the leaf page that takes on the content of the leaf page to be deleted, and, causes modification to the intermediate page that used to refer to both leaf pages (and now needs to only refer to the one remaining leaf page). No other page modification is required. The fact that modified pages keep their page ID dampens ripple effects of page modification extending upward in the hierarchy.

Owing to the immutable property, modified pages keep their page ID but receive a new object ID in the working mapping table and are marked for storage in a new object in KVS. Objects containing the older content of a modified page are marked for deletion. Pages that are deleted outright have their entries in the working mapping table deleted and have their KVS objects marked for deletion.

The head object for sub-directory 931, which is not immutable, is then written into KVS with the new working mapping table. Head objects of sub-directories/files to be deleted are deleted from KVS. New objects for freshly modified pages are created into KVS and objects containing old modified pages or entirely deleted pages are deleted from KVS.

If any files or sub-directories are to be added to sub-directory 931, new head objects for each are marked for creation in KVS, and the hierarchy of pages 935 are modified to reference these new files or sub-directories. The hierarchy of pages 935 are modified at least by adding references for the object IDs of the newly added sub-directories/files to one or more leaf pages of the hierarchy 935. This may include effective page modification, entire page addition or both. For example, addition of a large number of sub-directory/file objects may cause a single leaf page to split into two leaf pages. This causes modification to the existing leaf page (which takes on references to new object IDs but deletes some references to pre-existing object IDs), addition of a new leaf page, and modification to the intermediate page that used to refer to the single leaf page but now has to refer to both.

As mentioned above, owing to the immutable property, modified pages keep their page ID but receive a new object ID in the working mapping table and are marked for storage in a new object in KVS. Objects containing the older content of a modified page are marked for deletion. Pages that are added outright have new entries created in the working mapping table for them and are marked to have new objects created for them in KVS.

The head object for sub-directory 931, which is not immutable, is then written into KVS with the new working mapping table. Head objects of sub-directories/files being added are created into KVS. New objects for freshly modified pages or new pages are created into KVS and objects containing old modified pages are deleted from KVS.

In an embodiment, each page ID of sub-directory 931 and each sub-directory ID and file ID kept by distributed consistent database is implemented as an "inode" number. The key into KVS to fetch the object for any of these items is obtained by concatenating the inode number with an identifier of the overall file system.

In an embodiment each file is implemented as a distributed consistent database. As such, the content of any file can be large yet be easily accessed and/or manipulated through the characteristics of the distributed consistent database.

ii) Thin Provisioning Block Storage Systems

Figure 1A:
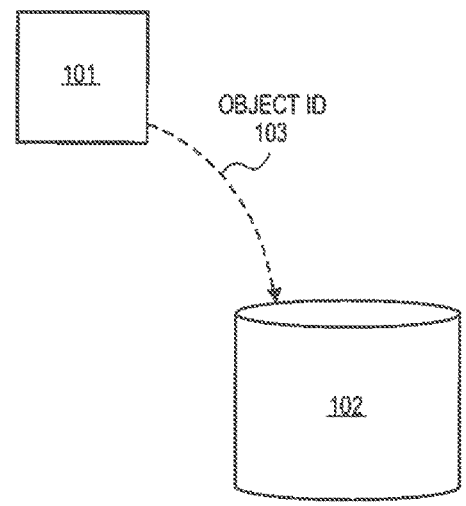
Figure 1B:
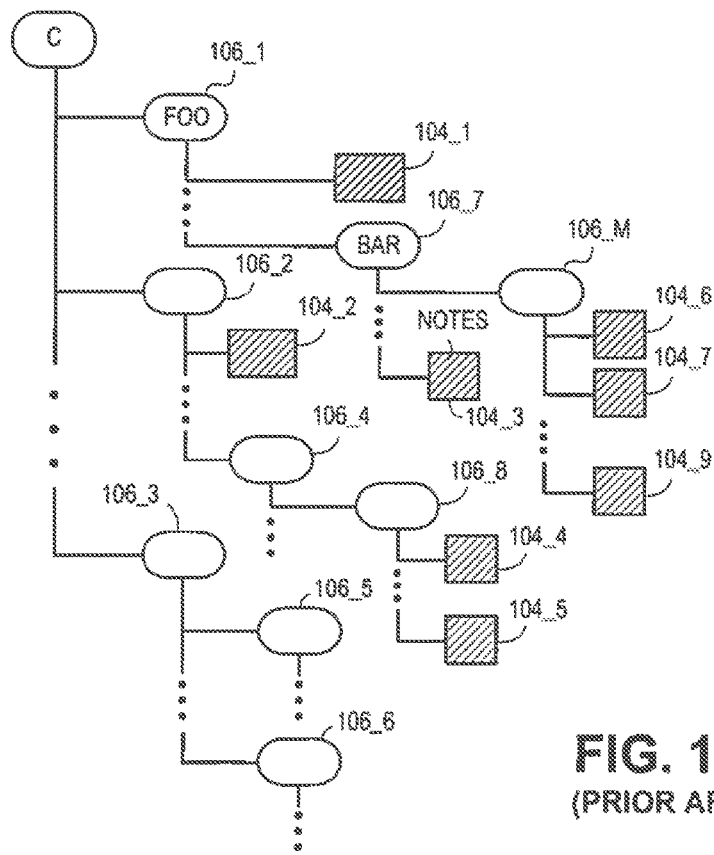
Figure 1C:
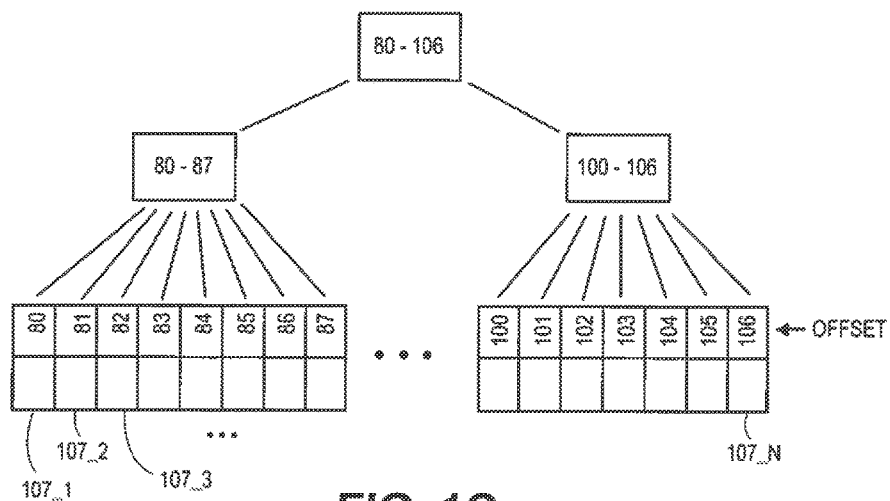
Figure 1D:
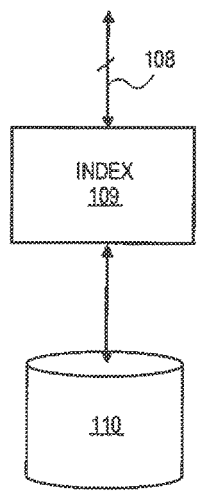

Recall from the background discussion of FIG. 1c that a common type of block storage is a "thin provisioning" system in which a block or "stripe" is identified by an offset within a larger "logical" storage resource, and where, "used" stripes are written into physical storage but unused stripes are not.

Figure 10:
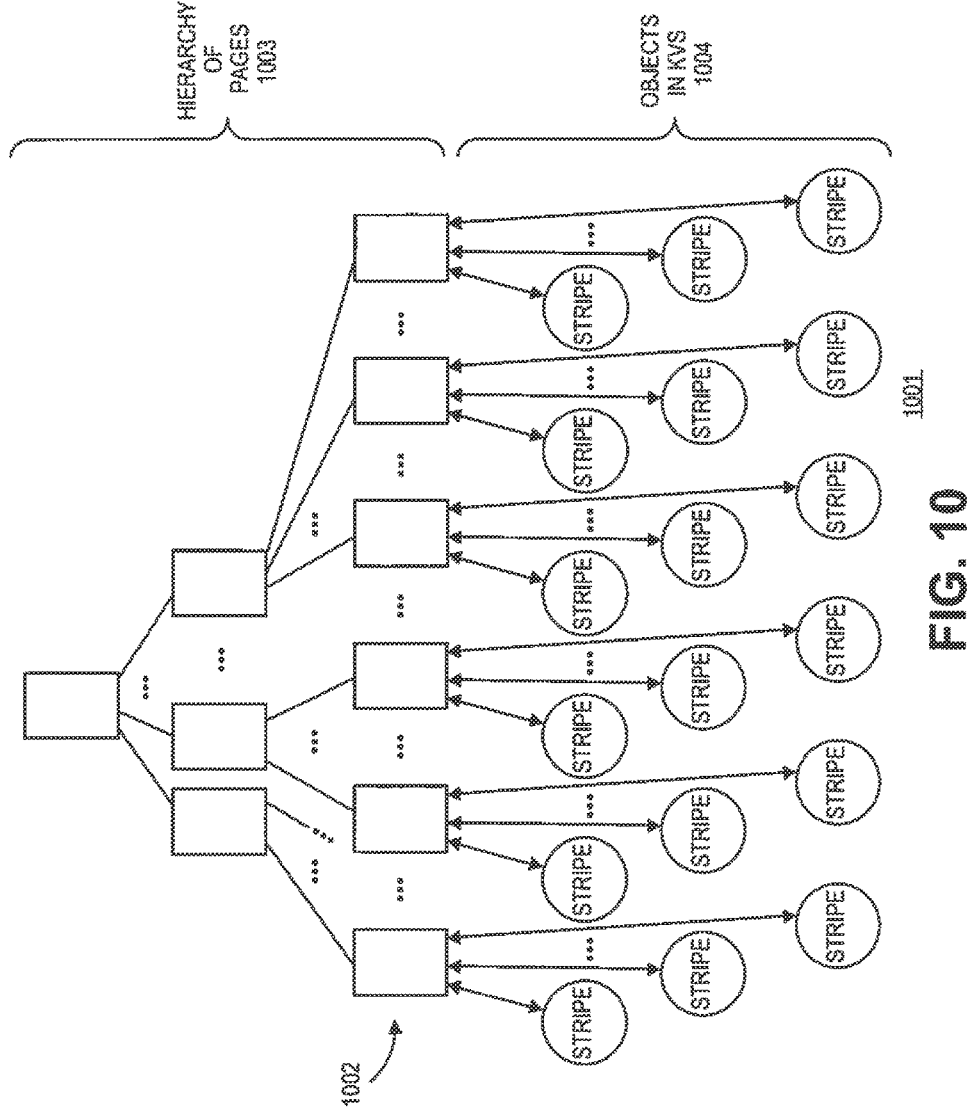
FIG. 10 depicts an exemplary use of a distributed consistent database to implement a thin provisioning block device.

FIG. 10 shows a "thin provisioned" block device implemented as a single "sparse file" that is represented as a distributed consistent database 1001. Here, the leaf pages 1002 of the distributed consistent database's hierarchy 1003 contain mappings that correlate an offset identifying a particular stripe of the sparse file to a particular object ID (that is, each object in KVS 1004 corresponds to a different stripe). In an embodiment there is one such mapping per leaf page so that, e.g., any two different stripes within a same sparse file can be simultaneously accessed. Other embodiments may choose to map multiple stripe objects from a single leaf page. Basic accesses to the distributed consistent database 1001 specify the offset of a particular stripe. The root and intermediate pages of the hierarchy of pages 1003 point to a correct lower page based on the offset specified in the access request. That is, the pages within the hierarchy 1003 of the distributed consistent database contain content to navigate to a particular leaf page based on an offset as the specified input criteria.

The content of the sparse file's stripes are stored in KVS objects. No effort is made to store the full extent of the unused portions of the larger file in KVS.

The behavior of a distributed consistent database that implements a sparse file will be as described above with respect to sections 3.1, 3.2 and 3.3. Here, in an embodiment, objects other than the head object used to implement a sparse file are made immutable (whether corresponding to intermediate or leaf pages or objects containing data stripes).

In one embodiment, all stripes are configured to be the same size. However in other embodiments, given that each stripe is implemented with its own KVS object, different stripes within a same thin provisioned file implementation can have their own custom/unique size configuration.

In order to increase throughput and performance, in an embodiment, only whole stripes are written to the KVS layer unless the application layer issues a flush on an incomplete stripe (in this case only the relevant portion of the stripe is written to KVS). A typical situation is the copying of an entire file in which copies are made in smaller sections than the full stripe size. For example, if a stripe is 1.6 Mb in size, sections of the copy for storage in the stripe may be made by the user in 16 Kb increments. In this case, the stripe is not written to until 1,000 such sections have been aggregated to form a full sized stripe's worth of data. The aggregation may be made anywhere above the KVS interface (e.g., by the DDS instance, or locally at the user's system). As discussed above, a KVS object containing a stripe is immutable so any such "write" is effected by writing the new stripe's worth of information into an entirely new object.

Operations to a file within a directory file storage system may be similarly aggregated (e.g., smaller sections of the file are aggregated above the KVS layer, then, a larger write operation is made to KVS that corresponds to the accumulation of all the aggregated parts).

Sparse files can be implemented as the "files" in a directory file system (e.g., as described above with respect to FIG. 9), or, some-other access structure may be used to access a particular one of many thin provisioned files.

3.5 Uses of the Distributed Consistent Database to Implement Applications on Top of Storage Systems Section 3.2 discussed the implementation of the file system directory and block storage system interfaces 206, 207 of FIG. 2. FIG. 2 also indicates that higher level applications such as quotas, and relational database layers can also be implemented with distributed consistent databases in KVS.

i) Quotas

A quota policy is typically used to assign a maximum amount of usable storage space to a particular user. In a common application, anytime a user attempts to write information into KVS, the quota policy is first accessed to understand what the user's maximum allotted storage amount is and how much of that allotment the user has already consumed. If the user's attempted write will exceed the user's allotted amount the user's write attempt is blocked.

In an implementation, a quota policy is implemented with a single distributed consistent database as discussed above. Here, an identifier of the user is used to first navigate through the node hierarchy of the quota distributed consistent database before the user's access is permitted. The object ID for an object in KVS having the quota information for a particular user is reached when a leaf page of the distributed consistent database's node hierarchy is reached. If the user's quota is will not be exceeded by the user's desired access, the access for the user is permitted into another database where the user's information is kept.

Additions, deletions and changes of user identifiers will cause changes to the distributed consistent database which may include changes to one or more pages in the node hierarchy of the distributed consistent database. The behavior of each affected distributed consistent database will be similar to that described above in Sections 3.1 through 3.3.

Figure 11:
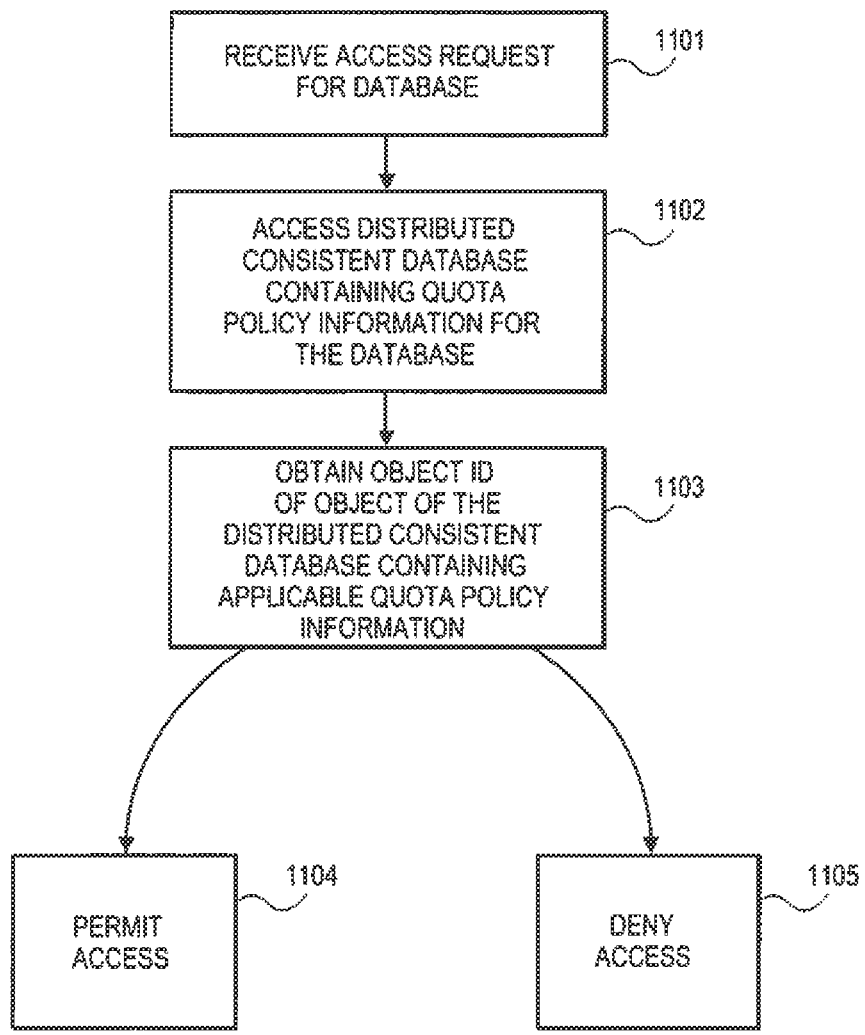
FIG. 11 depicts an exemplary use of a distributed consistent database to implement a quota system.

FIG. 11 shows a basic quota process. As observed in FIG. 11, an access for a user to (e.g., a distributed consistent) database where information for the user is kept is desired 1101. Instead of accessing this database, however, another distributed consistent database is fetched from KVS that keeps quota policies for the database 1102. Some form of identifier of the user is then applied to the quota database and its pages are progressed through as discussed above until a leaf page having an object ID for the user's quota record is obtained 1103. The object having the user's quota record is fetched from KVS. The quota record keeps information indicating how much storage space the user has used and how much storage space the user has been allocated. By comparing the contents of the record against details of the pending access, a determination can be made if the user will exceed the user's quota. If the pending access does not exceed the quota the user's access to the database is permitted 1104, if the pending access exceeds the quota the user's access is not permitted 1105.

Note that quota information is not limited to tracking capacity. The quota mechanism can be leveraged for other metrics, like the number of files for example.

ii) Relational Databases

Distributed consistent databases can also be used to implement a relational database. As observed in FIG. 12, the basic structures for a relational database include a first distributed consistent database 1201 that is used to implement a specific table ("table database"). Here, each object 1202 kept by the table database 1201 corresponds to a different row in a table of the relational database ("row object"). The row objects are retrieved with specific KVS object IDs. The hierarchy of pages 1203 of the table database 1201 accept primary key information for a particular row as input information. The resultant leaf page for the primary key input provides the object ID for the particular, targeted row object.

Queries into the table can be sped-up with one or more indexes 1204_1 through 1204_N. In an embodiment, each of the indexes 1204_1 through 1204_N is also implemented with its own respective consistent distributed database ("index database"), where, the objects "kept" by an index database correspond to the head objects of the table databases that the leaf pages of the index database point to. Here, the respective hierarchy of pages 1204_1 through 1204_N of each index database effectively implements the B+ tree of the index that the index database represents. The leaf pages provide the primary keys of the rows that match the query term. In a basic approach, there is one index for each column in the row structure (e.g., one index for every separate data item kept in the row objects 1202 of the table database 1201).

The structure of the primary key that is provided by an index includes an identifier of the head object for the table database (or information from which the head object for the table database can be determined). For example, the primary key may include both a table identifier and a row identifier. The table identifier is used to fetch the head object for the table database 1201 and the row identifier (or both the table identifier and the row identifier) are applied to the hierarchy of pages 1203 of the table database to obtain the object ID for the row identified by the primary key. Notably hashing may be performed on any of the components of a primary key provided by an index to obtain either or both of the object ID for the head object of the table database and/or the row identifier.

Figure 12:
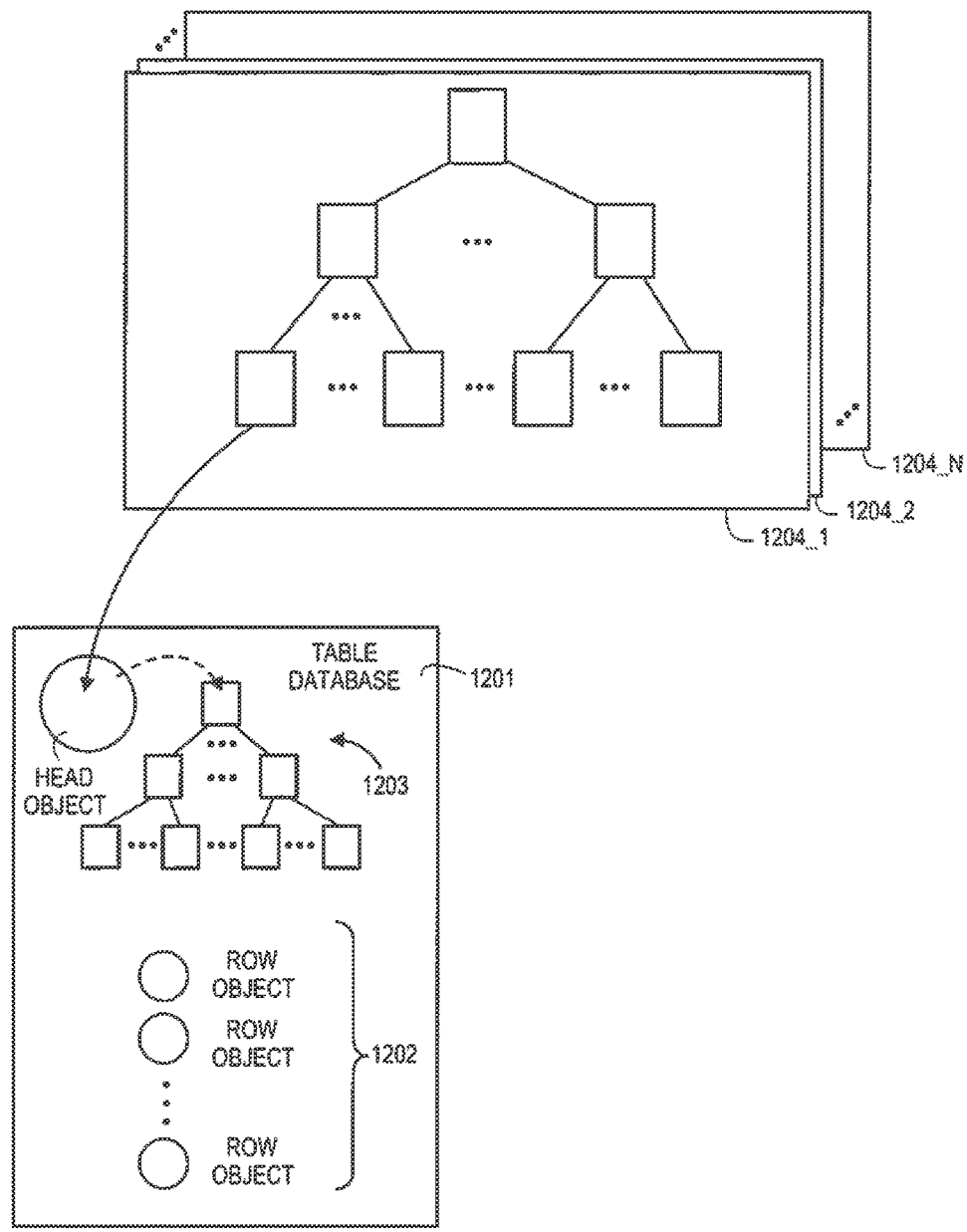
FIG. 12 depicts an exemplary us of a distributed consistent database to implement a relational database.

Other table databases for other tables within the relational database may be implemented with other consistent distributed databases (not shown in FIG. 12 for simplicity). The row object of one table database may include primary key information for another row object of another row object of another table database consistent with the operation of a relational database. As such, for example, a query process may entail firstly application of a query term to an index database 1204_1 which provides the primary key for a row object within a first table database. The contents of the row object may include a primary key for the row of a second table database. This primary key may then be used to access the second table database (through its head object, the primary key including or being useable to obtain the head object for the second table database) and the row within it specified by the primary key to obtain the result of the query.

In a simplest case all of the primary keys from an index database identify the same head object for a single table database although conceivably a single index database may provide primary keys for different table databases and their corresponding head objects. Any one or more of the indexes may be designed to support range queries or various other properties of an RDBMS.

Another "root" head object (not shown) may represent the entire relational database by including at least identifiers of the various index databases used to access the table databases. Thus, access to a particular relational database causes its corresponding root head object to be obtained. The query is then applied to the appropriate index database identified therein.

Changes to table databases in terms of addition or removal or rows (row objects) causes corresponding addition or removal of information within the content of the pages of the indexes that reference the added/deleted rows.

Quota systems can be applied to relational databases. For example a user may be limited on how many row objects the user is permitted to enter within the relational database. ACID transactions can also be performed on the relational database.

iii) Locking

Any of the storage system(s) described above may be enhanced to further include locking. Traditional data systems have often implemented a locking mechanism to ensure data consistency. Here, if an application/user/process (hereinafter, simply "user") is given a lock on a data item that the user desires to use, other users that may seek to simultaneously write or read to the data object are prevented from doing so. As such, the user that has been given access to the data item is free to update the data item without concern of other competing data writes or reads. This preserves the consistency of the data item as updates are only made serially.

Traditional locking mechanisms are difficult to implement in the case of extremely large database systems. Generally, the "overhead" processes needed to implement a traditional locking mechanism scale with the size of the data store. In the case of extremely large data stores, the overhead scales to a degree that significantly impacts performance. That is, users wait too long for a lock and/or for a lock to be released on a data item of interest.

FIG. 13 shows an architecture 1300 for an (e.g., extremely large) data store built 1300 with any/all of the architectural features discussed above in the preceding sections of the instant application but having an integrated locking mechanism as described in more detail below. As observed in FIG. 13, the architecture 1300 includes a plurality of connector node system instances (CNS nodes) 1303_1 through 1303_N that effectively connect a plurality of users 1305_1 through 1305_Y to a KVS data store 1301 through a network 1302. The network 1302 may be implemented, for example, as one or more networks and may include a wide area network (e.g., including the Internet).

Each CNS node contains a distributed database management system instance 1302_1 through 1302_N (DDS layer) that communicates with the KVS data store to provide data store services to any of a number useful data store related functional layers or bricks within each CNS node (e.g., thin provisioning, file system, relational database, etc.) for the users of the CNS node. One of the functional layers and/or bricks is a distributed consistent data base layer (DCD) that includes a locking service manager instance 1320_1 through 1320_N. For simplicity, among the aforementioned bricks, FIG. 13 only shows the DCD bricks and their corresponding locking service managers 1320_1 through 1320_N.

Each locking service instance 1320_1 through 1320_N is coupled to a cluster 1321 of distributing locking nodes 1322_1 through 1322_M. According to one embodiment, each locking service manager instance can engage in a request/response locking session with any of nodes 1322_1 through 1322_M within the cluster 1321. That is, for example, for any of the locking service mangers 1320_1 through 1320_2, a first request/response session for a first lock on a first data item may be held with any distributed locking node in the cluster 1321 and then a second, subsequent request/response session for a second lock on a second data item may be held with any other distributed locking node in the cluster 1321.

The ability to direct individual locking sessions from any particular locking service manager 1320_1 through 1320_N to any particular locking node 1322_1 through 1322_M provides reliability in the overall locking scheme. That is, if any particular locking node fails, its live request/response sessions can be directed to any other of the operational locking nodes without the original locking requestor noticing. In other embodiments, conceivably, certain users and/or locking service managers may be assigned or allocated to only a subset of locking nodes such that a lock request session from any such user/locking service manager is directed to one of the locking nodes of the subset. For example, one of the locking nodes may be deemed a "local" locking node for one or more CNS nodes who forward their locking requests to the local locking node. If the subset is of size one, failure of the locking node will require all requests originally targeted to the failed locking node to be directed to one or more other locking nodes.

FIG. 13 shows the locking service managers 1320_1 through 1320_N being directly coupled to the cluster 1321. In practice the locking service managers 1320_1 through 1320_N may be coupled to the cluster 1321 through one or more networks which may include a wide area network (such as the Internet) and/or network 1302 (partially or wholly).

As observed in FIG. 13, the locking nodes 1322_1 through 1322_M within the cluster are each coupled to a network 1323 to implement a distributed synchronization algorithm (e.g., PAXOS or a PAXOS-like algorithm). Distributed synchronization algorithms are typically designed to guarantee progression of information if an agreement/ consensus is reached among the majority of the participants. That is, if a quorum of the locking nodes 1322_1 through 1322_M agree to a change, the change should eventually reach the state information maintained by each of the locking nodes 1322_1 through 1322_M.

In an embodiment, the distributed synchronization algorithm used within the cluster 1321 of FIG. 13 considers all but one of the locking nodes 1322_1 through 1322_M to be an "acceptor" node and the remaining non acceptor node to be a "proposer" node. For the sake of example, assume locking node 1322_1 is deemed to be the proposer node. Even though locking node 1322_1 may be nominated as the proposer and therefore perform proposer functions, it may also continue to operate as an acceptor node. As such the acceptor nodes include locking nodes 1322_1 through 1322_M. In the context of distributed synchronization algorithms, the locking service managers 1320_1 through 1320_N can be viewed as client nodes of the acceptor nodes 1322_1 through 1322_M that they are engaged in locking request/responses with.

Figure 14:
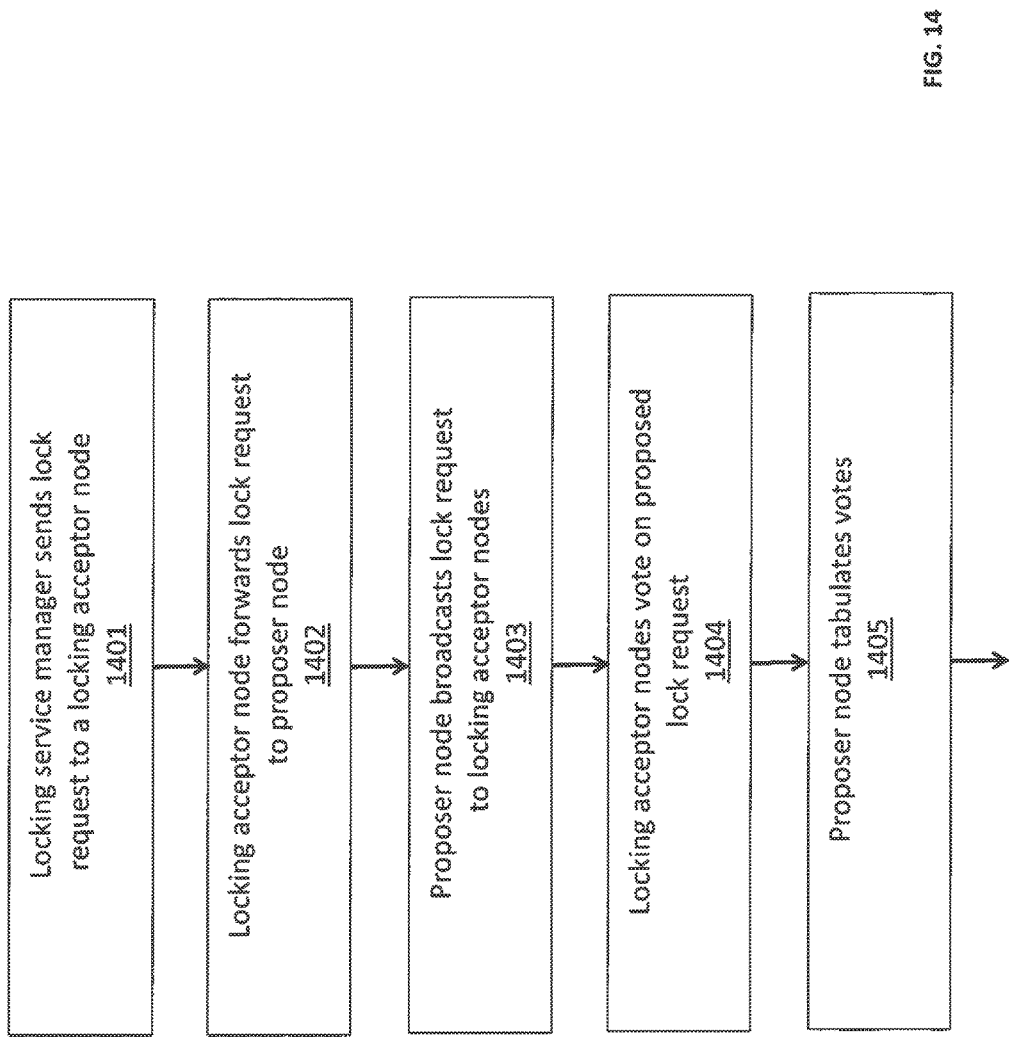
FIG. 14 shows a methodology that can be performed by the locking architecture of FIG. 13.
Figure 14:
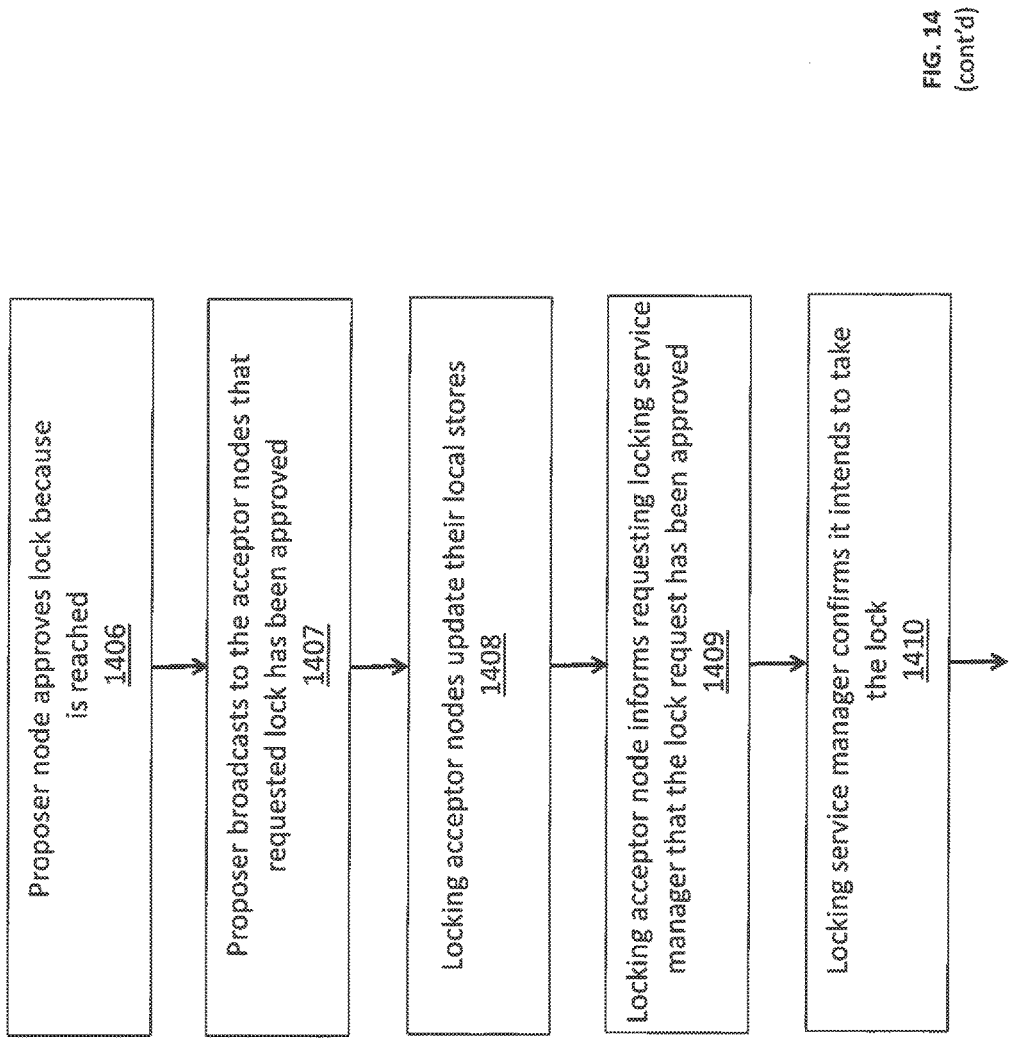

Referring to FIGS. 13 and 14, initially a request for a desired lock on a particular data item within KVS is sent 1401 from one of the locking service manager instances 1320_1 through 1320_N to one of the locking acceptor nodes 1322_1 through 1322_M. For the sake of example, assume that locking service manager instance 1320_N sends the request and that locking acceptor node 1322_M receives the request. The sending 1401 of the request by the locking service manager instance 1322_N is generally in response to one of the users that is coupled to the locking service manager's CNS node 1303_N having a desire to access the data item, write to the data item or read the data item and/or explicitly lock the data item.

The locking acceptor node 1322_M that received the lock request then forwards 1402 the lock request to the proposer node 1322_1. In response to receipt of the lock request, the proposer node 1322_1 broadcasts 1403 the proposed lock request to all of the locking acceptor nodes 1322_1 through 1322_M. In an embodiment, each locking acceptor node 1322_1 through 1322_M has its own associated persisted storage 1324_1 through 1324_M (e.g., a non volatile data store) that keeps state information on proposed and granted lock requests.

Each locking acceptor node 1322_1 through 1322_M then individually votes 1404 on whether or not the proposed change is acceptable based on the information within its local persisted store 1324. Here, in an embodiment, each locking acceptor node votes "yes" for the proposed lock request if there is no record of a competing approved lock request or actual existing lock in its local persistence store (that is, there is no approved lock request or actual lock request for the same data item that the proposed lock request seeks to lock). By contrast, if a locking acceptor node identifies a competing approved lock request or a granted lock within its local store it will vote "no" for the proposed lock request.

The votes are reported to and tabulated 1405 by the proposer node 1322_1. The proposer node 1322_1 will decide 1406 to implement the lock so long as a quorum of the locking acceptor nodes 1322_1 through 1322_M voted for acceptance of the lock ("a quorum is reached").

A quorum may exist, for example, if a majority but less than all of the locking acceptor nodes 1322_1 through 1322_M voted "yes" for the lock. Use of a quorum is particularly well suited for extremely large systems having, e.g., large numbers of locking acceptor nodes (M is large) spread over a wide geographic area because under such circumstances it is not uncommon for one or a few acceptors: 1) to be effectively unavailable to participate in the vote (e.g., owing to network failure, acceptor node failure, high network latency between the acceptor node and the propos- ernode or high latency within the acceptor node); or, 2) to vote against a lock in reliance on ultimately incorrect information (e.g., an acceptor votes "no" because of a competing lock that it has a record of when in fact it has yet to receive notice that the lock has been released).

If the proposer 1322_1 finds that a quorum exists the proposer broadcasts 1407 to each of the locking acceptor nodes 1322_1 through 1322_M that the requested lock has been approved. The locking acceptor nodes 1322_1 through 1322_M then update 1408 their respective local persistence store 1324_1 through 1324_M to reflect that the requested lock has been approved on the particular data item. In various embodiments, as described in more detail below, versioning numbers are assigned to lock requests to keep track of different lock requests that may simultaneously exist for a same data item. As such, the version number of the lock request that has just been approved is recorded in the local persistence store along with the identity of the data item and the fact that a lock request for it has been approved. Other or same embodiments may further record the type of lock that has been requested. Different types of locks are described in more detail below.

The locking acceptor node 1322_M that received the original lock request then informs 1409 the client locking service manager instance 1320_M that issued the original lock request that the lock request has been granted. The locking service manager then confirms 1410 back to the acceptor node 1322_M that it intends to go forward with the lock. The actual taking of the lock is then broadcast 1411 to all of the acceptor locking nodes 1322_1 through 1322_M (e.g., through the proposer or directly from the acceptor that received notice of the intention to take the lock). In response, the acceptor locking nodes 1322_1 through 1322_M update 1412 their corresponding local stores that the lock is actually set. In an embodiment, each acceptor locking node checks the version number of the lock that is purportedly being taken against the version number of the lock that was granted in process 1408. If the version numbers match no errors are raised. If the locking service manager instance informs the locking acceptor node that it does not intend to follow through and use the lock, the request is essentially dropped, the same is broadcast to the acceptor nodes which remove the entry for the lock in their local stores.

Any locking acceptor node that voted "no" for the lock request that is being set because its local persistence store showed the existence of a competing request (e.g., having an earlier version number) should expect to receive in the near future an indication that the prior competing request or lock has been withdrawn/released. If so, the acceptor's local store will eventually be updated to synchronize with the other locking acceptor nodes. If the expected notice does not arrive in sufficient or expected time, the locking acceptor node can raise an error which may result in loss of the lock to either or both of the competing lock holders.

When the locking service manager instance 1320_N that set the lock becomes aware that the lock is no longer needed for the data item (e.g., because the user that requested the lock has informed the locking service manager in some manner that the lock is no longer needed), the locking service manager 1320_M informs 1413 the acceptor locking node 1321_M (or conceivably another acceptor locking node) that the lock can be released. The news that the lock can be released is then broadcast 1414 to the other acceptor nodes (e.g., through the proposer or directly from the acceptor that received notice of the lock release). After notice of the lock release has been reported to all of the acceptor nodes 1321_1 through 1321_M, all of the acceptor nodes 1321_1 through 1321_M update 1415 their local store information that the lock no longer exists.

In the above example, as alluded to above, in an embodiment the locking node 1322_1 that behaves as the proposer node may also behave as an acceptor node and vote on the proposed lock, receive notice of the decision to implement the lock and update its local persistence store accordingly.

Although the above embodiment described the process for a single lock, in actual practice, the above process flow may be performed with "batches" of lock requests from a particular locking service manager. Here, recalling that the architecture of FIG. 13 is particularly useful in the case of a extremely large storage systems, a single locking service manager instance may receive a significant number of lock requests for various data items in brief amounts of time (e.g., from various ones of the users its CNS node is connected to).

As such, rather than send each of the lock requests as individual messages to a locking acceptor node, the locking service manager may combine a number of different lock requests into a single message that is sent to the acceptor node. The multiple lock requests are then forwarded to the proposer who broadcasts the proposed lock requests to the acceptor nodes as a batch of proposed locks that the acceptor nodes are to vote on. The voting results for the individual lock requests are tabulated by the proposer as a batch and the results broadcast by the proposer as a batch. As such, acceptor nodes update their local stores in batches and the results are reported to the original requesting locking service manager instance as a batch of lock request responses (some of which may be granted others of which may be denied).

As mentioned above, in various embodiments, lock requests may be versioned to prevent or diminish race conditions and/or other locking failures that can result in loss of data consistency. Here, the proposer node keeps a counter for the various data items and increments the counter each time a new lock request is received for the data item. Each lock request is broadcast from the proposer with its corresponding version number and the voting results are reported with the corresponding version number. Approval of the lock is likewise reported to the acceptor nodes with the version number and recorded in the corresponding local stores with the version number. The requesting lock service manager is also provided the version number when informed that the lock has been granted and the requesting lock service manager includes the version number when it confirms with the acceptor that it intends to take the lock.

Note that the failure of any acceptor node can easily be accounted for by routing incoming requests to other acceptor nodes. As each of the acceptor nodes attempt to maintain synchronized lock state information, the lock state for the entire system is essentially replicated multiple times over. As such, existing request sessions handled by a failed acceptor node do not need to be dropped and can be transferred over to one or more other working acceptor nodes. Additionally, even if the proposer node fails, each of the acceptor nodes are configured with proposer node logic so that any one of them can be anointed as the new proposer. As such, each locking node 1322_1 through 1322_M not only includes acceptor logic to implement the acceptor functions but also includes proposer logic to implement proposer functions.

Triggering whether a lock is to be granted on a mere quorum holds out the possibility that any granted lock may not be truly guaranteed. However, recall from the discussion of FIG. 8 that the KVS storage platform 1301, 1302 performs a head object version number check 811 prior to commitment 812 of a write into KVS. As such, even though the locks themselves may not be absolutely guaranteed, data consistency is ultimately preserved by the consistency preservation mechanism of KVS.

Although the taking of a lock was mainly described above as being taken by a user, locks may also be taken by any of the functional bricks alluded to above within a CNS node at discussed at length in preceding sections of the instant application. Thus locks may be taken by users directly or by functional bricks (e.g., on behalf of a user).

In various embodiments different types of locks may be requested through an application programming interface (API) of a locking service manager instance. For example, in various embodiments various combinations of a "setLock", a "getLock" and a "queueLock" may be available through the API. Each of these are described in more detail further below. The API may also offer a "cancelLock" method which is an affirmative request to drop an earlier lock request. Upon receipt of a cancelLock by a locking service manager, the locking service manager reports the event to an acceptor node. All acceptor nodes are informed of the event and update their local stores by dropping their corresponding entries for the request being dropped. The lock to be dropped may be identified not only by the affected data item but also the version number of the lock on the data item.

According to one embodiment, a successful "setLock" results in an understanding that the data item is locked (i.e., the lock status is not supposed to change until the entity having possession of the lock releases it). Users, functional brick or a locking service manager can specifically request a "setLock" to the cluster 1321 and the cluster 1321 returns either a SUCCESS or FAILURE. In an embodiment, in the case of a setLock, the acceptor nodes can only vote "yes" if there are no approved requests or actual locks in place for the data item. The proposer may inform the acceptors not only of which data item is being requested but also that a setLock is being requested. The type of lock (setLock) may be recorded in the local stores of the acceptor nodes along with the other meta data for the entry (e.g., data item identity, version number, etc.).

In an embodiment, a "getLock" can initially return with a SUCCESS or a FAILURE. A SUCCESS means that a lock on the data item is available. As such, in the case of getLock SUCCESS, a user will often follow up with a setLock for the same data item. A return of FAILURE means that a lock on the data item is not available. As such, in the case of getLock FAILURE, a user will often follow up with a request for a different data item. In an embodiment, the acceptor nodes vote according to the same rules as with a setLock. In the case of successful vote, the setting of the getLock status in the local stores will have the effect of causing subsequent requests for the same data item to be blocked. In the case of a failing vote, the acceptor nodes record that a getLock request has failed for the data item. Upon the original requesting locking service manager instance being informed that the getLock request was a failure, the locking service manager may nevertheless retry to get the lock a few times (e.g., once more, twice more, three times more, etc.) before giving up and returning a FAILURE to the client.

If a getLock request results in a failure, presumably there was an earlier approved or existing lock on the same data item when the proposer requested the vote for the getLock request. As such, there may presently exist in the local stores of the acceptor nodes records of two or more competing locks for the same data item. The status of getLock and/or the version number permits the acceptor nodes to differentiate the failed getLock lock from the other locks.

According to another type of embodiment, a "queueLock" essentially provides for the waiting of a setLock for the requested data item after it becomes free if it is already locked. Here, a request response of SUCCESS is handled similarly to a setLock but a request response of FAILURE (return code shall be queued) means the requestor should expect a callback in the future from the cluster 1321 after the pre-existing competing approval(s)/lock(s) have been dropped/released. In an embodiment there is no time limit as the timing of the callback depends on when the conflicting lock is freed.

Here, within the cluster 1321, the queueLock request is identified as such by the proposer. In the case of a FAILURE, a quorum of acceptor nodes must have recognized a competing lock. Upon the proposer announcing FAILURE of the queueLock at least one acceptor node internally places a local watch on the competing lock (e.g., the acceptor node that handled the original queueLock request). When the acceptor node notices that the competing lock is relinquished it issues a callback to the locking service manager that made the original queueLock request.

In various embodiments multiple acceptor nodes may locally watch the status of the competing lock to provide reliability/redundancy within the cluster 1321. Should the acceptor node that handled the original queueLock request fail, one of the other remaining acceptor nodes that is locally watching the competing lock can complete the cycle for the original queueLock on behalf of the failed acceptor node. Here, the proposer when announcing the queueLock or its failure should also identify the calling locking service manager so the local stores of the acceptor nodes can record this information so they know who to communicate to if any one of them has to complete the sequence for the lock request.

In response to an initial FAILURE of a queueLock, the calling locking service manager will queue the failed request (e.g., with other failed queueLocks) in a queue or storage/memory that is, e.g., local to the service manager. Upon callback from the cluster 1321 that the requested data item is now free, the locking service manager issues another request for the lock. Within the cluster 1321 the same procedures for setLock are then followed (the proposer issues the lock request and the acceptors vote on the request resulting in a return to the locking service manager of SUCCESS or FAILURE).

In various embodiments, any of the lock requests described above may be specified as a "range lock" that attempts to lock a range of data such as the range of data that corresponds to a number of stripes of a thin provisioned file. Here, a request will specify a "range" of data items (e.g., a sequential set of stripes within a thin provisioned file). The proposer specifies the range when requesting a range lock and the acceptor nodes include in their local stores the ranges of any currently existing range locks within the system. If an acceptor node does not detect any overlap between the ranges of the system's current locks and the range of the proposed lock (as well as does not detect any scalar lock on a data item within the range of the proposed lock), the acceptor node will vote "yes" for the proposed range lock. By contrast, if an acceptor node detects any overlap between the ranges of the system's current locks and the range of the proposed lock (or detects any scalar lock on a data item within the range of the proposed lock), the acceptor node will vote "no" for the proposed range lock. A return of SUCCESS or FAILURE is then based on the voting of the acceptor nodes. A range can be specified for any of a setLock, getLock or queueLock.

Although the discussion immediately above was directed to ranges specified in stripes—other types of ranges may be specified. For example, in one embodiment a range of bytes may be specified in a lock request. In this case two different locks may be applied to the same stripe so long as their byte ranges do not overlap. Thus, range locking can have various degrees of granularity (e.g., byte range locking having finer granularity than stripe range locking).

As is known in the art, "Portable Operating System Interface" (POSIX) is a family of standards specified by the IEEE for maintaining compatibility between operating systems. POSIX defines the application programming interface (API), along with command line shells and utility interfaces, for software compatibility with variants of Unix and other operating systems. One flavor of POSIX includes a locking API and various embodiments of the above described locking semantics may be requested by a user through a POSIX API offered by the locking service manager.

iv) I/O Improvements

Any of the storage system(s) described above may be enhanced to further include I/O improvements as discussed below. Recall that the use of a quorum may result in absolute locks being difficult to guarantee but that data consistency is still maintained by the head version checking mechanism performed by the KVS layer 1301, 1302 just prior to commitment of a change into KVS. Performance may nevertheless be impacted if a user proceeds to prepare a large amount of write data for storage into KVS only to have the write rolled back because the head object versions did not match at the moment of commitment.

An example is a write into a large file such as a large thin provisioned file. Here, new data for a large number of stripes may be written, e.g., into a buffer that is local to the user's CNS node. When the writing into the buffer is complete, an attempt is made to write the entire buffer into KVS which includes the writing of all of the buffer's data into KVS. After the buffer's data is written into KVS, a versioning check of the file's head object is performed by KVS as a final consistency check. If the check passes there is no problem. However, if the check fails the entire write is rolled back (by not committing a new head object that reflects the newly written to data file). As such, time and resources where devoted to a large data write into KVS that never took effect. Although the buffer contents within the CNS node may be preserved, the write into KVS will need to be redone. The essence of the problem is that the entity that is writing the data into KVS has no awareness that another entity might have gained access to the head object for the file being written to and changed its version number (e.g., while the large write into the buffer or KVS was being undertaken).

FIG. 15 shows an improved approach 1500 that prevents the aforementioned performance hit. According to the architecture of FIG. 15, upon a (e.g., range) lock being granted 1501 for a particular file within KVS 1501, the head object for the file is fetched 1502 from KVS 1501 and the version number for the file's head object is forwarded to an acceptor node 1503 and stored in the local stores of the cluster 1521 (e.g., via broadcast internal to the cluster). Here, recall from the discussion of FIG. 8 that an initial fetch 801 of a file's head object is performed in order to prepare new pages and a mapping table. In an embodiment, the version number of the head object is taken from this initial fetch 1501 and reported to the acceptor node 1502 that provided the granted range lock (the version number may also be replicated to other acceptor nodes within the locking node cluster). The head object is then written back into KVS 1504 with meta-data that identifies the acceptor node that has its current version number and that any change to the version number of the head object is to be reported to the acceptor node.

The entity that has access to the range lock may then finish writing into the aforementioned buffer within the CNS node (not shown). Here, as the amount of data being written may be large, the writing into the buffer may not be complete until some time has passed after the granting of the lock 1501 and the reporting of the head object version number 1503. If an entity other than the entity that has the range lock subsequently accesses and changes the version number of the head object (such as an entity that had a non overlapping range lock on the same file), the previously stored meta-data 1504 is used to report to the acceptor node that the version number has changed 1505.

The acceptor node then informs 1506 the corresponding locking service manager instance of the event which informs the entity that had the lock that the version number of the head object for the file it desired to write to has been changed. As such, a "pessimistic file synchronization" is effectively at play. With this information the entity that had the lock can at least refrain from writing any data in the buffer into KVS 1501. The entity can then update its local copy of the head object to include a next higher version number and begin writing the buffered data into KVS. When using the pessimistic file synchronization mechanism; every time one committer commits, then it send an event to any other to refresh their corresponding head object. If the event is lost for some committer, it will fail & retry writing the head object with the new version. In an embodiment, in all cases, every committer will have to reload all objects that potentially conflicts with theirs and replay their own modifications (which shall not conflict because of the locks that have been granted).

Operations performed on a folder or higher level node of a directory, as opposed to a file, may have affects on significant numbers of lower entities of the hierarchy (e.g., the lower folders and files). For example, if the contents of first and second folders are merged within a third folder and the first and second folders are discarded, each of the entities within the first and second folders need to be treated as falling within the third folder and not under either of the first and second folder.

A current design accumulates folder or directory operations made through a same CNS node within a CNS node buffer. Eventually a background process will commit the folder/directory operations into KVS. If a user desires information pertaining to a folder that has had an operation applied to it, but the operation has not been committed to KVS and is instead still listed in the buffer, the CNS node will refer to the buffer to give the user a "consistent view" of the folder operations that have been made to it.

For example, considering the aforementioned example, if the deletion of the first and second folders and the inclusion of their contents into third folder have not actually been committed to KVS yet, if a user requests to see the directory, the CNS node will refer to the buffer to understand that the user needs to see the contents of the first and second folders as being included within the third folder and that the first and second folders do not exist. A problem is that this approach is only confined to changes made through a same CNS node and the user will not be able to see changes made to the directory that are made by users that are connected to other CNS nodes.

FIG. 16 shows an architecture 1600 that is designed to improve the consistency of folder or directory changes across the CNS nodes. According to the design of FIG. 16, the local storage of each acceptor node is configured to hold a "distributed consistent map" 1601 that essentially lists the operations that have been made to folders or higher directory nodes by users but that have not yet been recorded in KVS. Ideally the map 1601 is synchronized across the acceptor nodes 1624_1 through 1624_M so that each acceptor node maintains a same version of the map.

Referring to FIG. 17, if a user desires a view of, e.g., a directory, the CNS node that is connected to the user requests a copy of the map from an acceptor node 1701. As discussed above, the map lists operations that are deemed to have been performed on directories even though they have not actually been committed yet into KVS 1301. If the directory that the user has requested a view of has entries in the map, the CNS node can refer to the map to show the user the correct (updated) view of the directory 1702.

If a user desires to additionally make a change to a directory the user then submits the desired changes through its CNS node 1703. The CNS node forwards an updated map showing the changes (e.g., additions/deletions/modifications of files/folders) to an acceptor node who forwards them to the proposer node 1704. The proposer node then broadcasts the changes to the acceptor nodes for a vote 1705. Any acceptor node whose version of the map conflicts with the proposed change will vote "no" for the change.

For example, if the change is to merge the contents of the first and second folders into a third folder and then delete the first and second folders, a particular acceptor node having a version of the map that shows deletion of the third folder will vote no for the change. Thus, if in the interim between when the user's CNS node was provided with a map 1701 and when the changes were submitted to the acceptors for a vote 1705 another "earlier" user was able to submit a request to delete the third folder, have the change voted on have a quorum reached and the same communicated to the acceptors nodes who subsequently updated their local stores, the user's desired changes 1703 would fail because each of the acceptors would vote against the change.

In this manner, changes made to a same directory by users connected to other CNS nodes can be implemented in a consistent manner to the user. With the user's requested change having been denied and with receipt by the user's CNS node of a new map showing the earlier change, the user's new view would show that the third folder has been deleted.

In an embodiment, referring to FIG. 18, there exists a separate map for each directory (e.g., made accessible for a particular user, organization, etc.) and the system is enhanced to recognize when only one CNS node has requested a map for a particular directory. Here, a global counter is maintained for the map that tracks the number of CNS nodes that are currently working with the map.

According to one embodiment, if no users are currently working on the directory, the map has a counter value of 0. When a CNS node requests the map 1801 (e.g., because a user that is connected to the CNS node desires to make changes to the directory), the map counter is incremented to 1, the ID of the requesting CNS node is recorded in the map and broadcast to all acceptor nodes so that they can synchronize their maps accordingly.

The map is sent to the CNS node 1802. With the counter having a value of 1 only the CNS node that has just requested and received the previously unused directory is in a position to make changes to the directory. The CNS node is therefore permitted to keep a local buffer that lists changes made to the directory through the CNS node and does not have to immediately commit the changes to KVS. Such changes can be implemented, e.g., at the CNS node's convenience with a background process. Here, changes can be made by other users so long as they are connected to this same CNS node.

If another user that is connected to another, second CNS node desires to make a change to the same directory, the second CNS node requests the map from any acceptor node and the map counter value is incremented 1804 to a new value of 2 which is broadcasted amongst acceptor nodes to synchronize. The map with new counter value of 2 is then forwarded to the second CNS node. Recalling that the ID of the first CNS node is included in the map, a callback 1805 is made from an acceptor node to the first CNS node to inform the first CNS node that another (the second) CNS node desires access to the map.

In response, the first CNS node prioritizes the background process to commit 1806 into KVS all of the changes to the directory that are listed in its local buffer. When all the changes made in the first CNS node's buffer are committed to KVS, the first node's version of the map is updated to reflect these changes, and the new updated map is sent to an acceptor node 1807. If the first CNS node desires to continue to make changes to the directory, the new updated map as sent by the first CNS node retains its counter value of 2. By contrast, if the first CNS node is finished making changes the first CNS node will decrement the value of the counter to a value of 1 and send the updated map to the acceptor node. The updated map is then broadcast to all acceptor nodes and an instance of the updated map is forwarded to the second CNS.

If the updated counter has a value of 2 it is understood that two CNS nodes may be simultaneously making changes to the same directory. As such, both CNS nodes will recognize that they cannot use their local buffer to implement changes but must instead forward them to their corresponding acceptor nodes so that their proposed changes can be voted on (as per processes 1704, 1705 of FIG. 17). That is, when two or more CNS nodes have an instance of a same map and desire to make changes, the changes are proposed to and voted on by the acceptor nodes of the cluster. Upon a favorable vote, the changes are reflected in each map instance held at each acceptor node and the CNS node that requested the changes is informed that the changes have been approved. The CNS node that requested the changes is then free to commit the changes to KVS. Any subsequent changes requested to be made by the other CNS nodes with possession of the map that conflict with these changes will be denied by the voting process of the acceptor nodes. In this manner conflicting changes are prevented. In one embodiment anytime a change to a map is approved by the cluster, the latest version of the map showing the approved changes is "pushed out" to all CNS currently holding the map. As such, all CNS nodes are apprised of the "latest view" of the directory and will avoid sending requests for competing changes downstream.

If the updated counter has a value of 1, the second CNS node will recognize that it is the only CNS node that currently desires to make changes to the directory and is free to use a local buffer to make the changes.

Notably, the above process can scale to counter values well beyond 2. That is, more than two CNS nodes can simultaneously implement changes to the directory so long as those changes are implemented through an acceptor node and with the corresponding voting process.

When a CNS node is finished making changes to a directory and those changes have been committed to KVS via its background process, the CNS node on its own initiative and without a priori notice that another CNS desires to make changes to the directory may update its version of the map, decrement its counter value and forward it to an acceptor node. The updated version of the map with decremented counter value is then broadcast to all acceptor nodes.

From the above discussion, it should be clear that in various embodiments: 1) the map is a distributed consistent map that is built on top of the cluster; 2) in the case of multiple simultaneous users of the map, the map is consistent as each operation to the map goes through a voting round within the cluster; 3) the map can be accessed by any CNS node that is connected to any node of the cluster; 4) all CNS nodes can have a same view of map; 5) the map is fault tolerant and persistent, any individual failures of connectors, cluster nodes, clients does not impact the content distributed map; 6) provides for both asynchronous (one CNS node has the map) APIs and synchronous (more than two CNS nodes have the map) APIs.

From the overall discussion above it should be clear that a consensus based cluster as described above can be used to implement and of a distributed locking system (including distributed range locking), a pessimistic file synchronization system and a scaled-out directory system. Other possible uses of the cluster may include: 1) tracking readers and writers on an open file (e.g., in the case of video file is being read, the writer to the video file syncs more frequently so the reader views a more "real-time" experience; 2) monitoring file system wide snapshots (the global snapshot number is "atomically" bumped on the cluster; 3) any other applications/uses that desire a global point of synchronization/serialization.

4.0 Implementation Embodiments

Any combination of the storage services/technologies discussed in the preceding sections may be made to provide storage services for one or more users.

FIG. 19 is a schematic depiction of various manners in which any of the architectures and methods discussed above can actually be implemented in practice. As observed in FIG. 19, multiple CNS instances 1903_1 through 1903_N including their corresponding DDS stack 1902_1 through 1902_N can be configured to run on their own operating system instance and virtual machine 1950_1 through 1950_N. A single computing system (e.g., a server, a personal computer, a tablet device, a mobile handheld device, etc.) may support the execution of one or more CNS instances. In the case where multiple CNS instances are executed within a single computing system, the respective virtual machines of the multiple CNS instances may run on a virtual machine monitor. A CNS instance may also run on an operating system that runs directly on a computing system's CPU hardware (i.e., no virtual machine is utilized).

Regardless, as depicted in FIG. 19, there may be more than one computing system 1351_1 through 1351_N each having at least one CNS instance with corresponding DDS stack.

As discussed above, each CNS instance may support multiple users 1305_1 through 1305_N. The multiple users may be separated from their respective CNS node(s) by any of a wide area network (WAN), metropolitan area network (MAN), local area network (LAN). A user may even be an application instance running on the same computing system that is supporting its CNS node (no external network). Multiple users may be connected to any or all of the CNS nodes by way of a same network or multiple networks.

Likewise, each of the CNS nodes may be connected to KVS through any of a WAN, MAN or LAN. Conceivably a CNS node may run on a same computing system upon which a KVS node is instantiated (i.e., no external network between the CNS node and the KVS node). Multiple CNS instances may be connected to KVS by way of a same network or multiple networks.

KVS, as discussed above in Section 2.0, may be implemented as a distributed storage system. In this case, the various distributed nodes of the KVS system are typically separated by a MAN, but may also be conceivably separated by a LAN and/or WAN.

A "cloud storage" service may be provided where the CNS nodes acts as gateways to the cloud storage service.

Processes taught by the discussion above may be performed with program code such as machine-executable instructions which cause a machine (such as a "virtual machine", a general-purpose CPU processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

A storage medium may be used to store program code. A storage medium that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

FIG. 20 is a block diagram of a computing system 2000 that can execute program code stored by a storage medium. It is important to recognize that the computing system block diagram of FIG. 20 is just one of various computing system architectures. Different types of computing systems include mobile and/or handheld computing devices (e.g., smartphones, cell-phones, personal digital assistances), laptop personal computers, desktop personal computers, servers, etc.

The applicable storage medium may include one or more fixed components (such as non volatile storage component 2002 (e.g., a hard disk drive, FLASH drive or non volatile memory) or system memory 2005) and/or various movable components such as a CD ROM 2003, a compact disc, a magnetic tape, etc. operable with removable media drive 2004. In order to execute the program code, typically instructions of the program code are loaded into the Random Access Memory (RAM) system memory 2005; and, the processing core 2006 then executes the instructions. The processing core 2006 may include one or more CPU processors or CPU processing cores.

It is believed that processes taught by the discussion above can be described within various source code software environments such as, for example, object-oriented and/or non-object-oriented programming environments including but not limited to: C+/C++, PYTHON, Java, Erlang, JavaScript, etc. The source code can be subsequently compiled into intermediate code for translation on a translator/virtual machine, or, compiled into object code targeted for a specific processor instruction set architecture.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A storage system, comprising:
    a) an object store comprised of a plurality of hardware storage devices having a plurality of objects containing information; and
    b) a cluster of locking nodes to implement a distributed synchronization locking mechanism, each locking node implemented with a computer, the cluster of locking nodes including a proposer node and a plurality of acceptor nodes, the acceptor nodes to accept requests to lock information of the storage system, the acceptor nodes to provide respective responses to the requests, the acceptor nodes having respective stores to store locking information that keeps track of approved locks and existing locks, the proposer node being an acceptor node that has been assigned the responsibility of being a proposer node, the proposer node to broadcast to the acceptor nodes a proposed lock, the acceptor nodes to vote on the proposed lock based on their respective locking information, wherein the proposed lock is approved in response to a majority but less than all of the acceptor nodes having voted in favor of the proposed lock, where, an acceptor node did not vote in favor of the lock because the acceptor node: 1) was unavailable; or, 2) voted in reliance on incorrect information, and wherein, the acceptor node that did not vote in favor of the lock raises an error flag if it does not eventually reach a state that approves the lock.

2. The storage system of claim 1 wherein the cluster of locking nodes is coupled to a connector node that users couple to in order to access said object store.

3. The storage system of claim 2 wherein said locking information is synchronized across multiple ones of said acceptor nodes so that live locking sessions can be maintained in the event of an acceptor node failure.

4. The storage system of claim 2 wherein said connector node is to send batches of locking requests from multiple ones of the users to one of the acceptor nodes.

5. The storage system of claim 4 wherein said proposer nodes proposes said locking requests in a batch and said acceptor nodes vote on said locking requests in a batch.

6. The storage system of claim 2 wherein said connector node is able to request at least one of:
    a setLock;
    a getLock;
    a queueLock.

7. The storage system of claim 2 wherein said connector node accepts said lock request through a POSIX API.

8. The storage system of claim 1 wherein the procedural protocol executed between the proposer node and the acceptor nodes is based on PAXOS.

9. The storage system of claim 1 wherein the proposer node maintains a version number for the lock request.

10. The storage system of claim 1 wherein the lock request is a range lock.

11. The storage system of claim 1 wherein the object store is organized to store the information in a structure comprising:
    a first plurality of immutable objects containing the information;
    a second plurality of immutable objects containing a hierarchy of pages for accessing said first plurality of immutable objects;
    a mutable object containing a mapping table that maps identifiers of said pages to identifiers of objects of said second plurality of immutable objects.

12. The storage system of claim 1 wherein one of the acceptor nodes also stores versioning information of an object in the object store that that the one acceptor node granted a lock on for an entity, wherein meta data of the object identifying the one acceptor node is written into the object store, the acceptor node to receive first notice from the object store that the version number has changed and the acceptor node to send second notice to inform the entity that the version number has changed in response.

13. The storage system of claim 1 wherein the entity in response to receiving the second notice refrains from committing information of the object to the object store with a version number for the object that the entity had intended to use prior to receiving the second notice.

14. The storage system of claim 13 wherein the entity commits information of the object in the object store with a second version number incremented above the version number in response to receiving the second notice.

15. A method for accessing information kept in an object store, comprising:
    performing the following at a proposer node implemented with a computer, the proposer node being within a cluster of acceptor nodes, the proposer node being an acceptor node that has been assigned the responsibility of being a proposer node, the acceptor nodes to accept requests to lock information of the storage system, the acceptor nodes to provide respective responses to the requests, the acceptor nodes having respective stores to store locking information that keeps track of approved locks and existing locks:
    receiving a request from an acceptor node for a lock on an item in an object store, the object store implemented with hardware storage devices;
    proposing the requested lock to the plurality of acceptor nodes;
    after a majority but less than all of the acceptor nodes have referred to their respective locking information and voted in favor of the requested lock, informing the plurality of acceptor nodes that the lock has been approved, where, an acceptor node did not vote in favor of the lock because the acceptor node: 1) was unavailable; or, 2) voted in reliance on incorrect information, and wherein, the acceptor node that did not vote in favor of the lock raises an error flag if it does not eventually reach a state that approves the lock.

16. The method of claim 15 wherein the requested lock is part of a batch of requested locks received from a connector node, wherein the batch of requested locks are proposed together and voted on by the acceptor nodes together.

17. The method of claim 15 wherein the lock request is at least one of:
    a setLock;
    a getLock;
    a queueLock.

18. The method of claim 15 wherein the method further comprises the proposer node maintaining a version number for the lock request.

19. A non transitory machine readable medium containing program code and not transitory propagating signal energy that when processed by a computing system causes a method to be performed, the method comprising:
    performing the following at a proposer node, the proposer node being within a cluster of acceptor nodes, the proposer node being an acceptor node that has been assigned the responsibility of being a proposer node, the acceptor nodes to accept requests to lock information of the storage system, the acceptor nodes to provide respective responses to the requests, the acceptor nodes having respective stores to store locking information that keeps track of approved locks and existing locks:
    receiving a request from an acceptor node for a lock on an item in an object store, the object store implemented with hardware storage devices;
    proposing the requested lock to the plurality of acceptor nodes;
    after a majority but less than all of the acceptor nodes have referred to their respective locking information and voted in favor of the requested lock, informing the plurality of acceptor nodes that the lock has been approved, where, an acceptor node did not vote in favor of the lock because the acceptor node: 1) was unavailable; or, 2) voted in reliance on incorrect information, and wherein, the acceptor node that did not vote in favor of the lock raises an error flag if it does not eventually reach a state that approves the lock.

20. A method, comprising:
    an acceptor node sending to an entity a map having changes made by a user to a directory of a file system implemented within an object store, wherein the changes have been approved by at least a majority of a plurality of acceptor nodes but have not been committed to the object store, the acceptor node implemented with a computer;
    the acceptor node receiving back from the entity additional changes made by another user to the directory, the additional changes not committed to the object store;
    a proposer node proposing the additional changes to the plurality of acceptor nodes, the plurality of acceptor nodes implemented with a plurality of computers, the proposer node implemented with another computer;
    the acceptor nodes voting on the additional changes;
    the proposer node broadcasting to the acceptor nodes that the additional changes have been approved in response to a majority but less than all of the acceptor nodes approving the additional changes, where an acceptor node did not vote in favor of the additional changes because the acceptor node: 1) was unavailable; or, 2) voted in reliance on incorrect information;
    the acceptor node adding the additional changes to the map even though the additional changes are not yet committed to the object store.

21. The method of claim 20 wherein the method further comprises presenting another user with a view of the directory that takes into account the changes on the map.

22. The method of claim 20 wherein the map includes a counter number.

23. The method of claim 22 further comprising incrementing the counter in response to the entity requesting the map.

24. The method of claim 20 further comprising after the sending additionally sending to the entity notice that another entity also has the map.

25. A non transitory machine readable medium containing program code and not transitory propagating signal energy that when processed by a computing system causes a method to be performed, the method comprising:

an acceptor node sending to an entity a map having changes made by a user to a directory of a file system implemented within an object store, wherein the changes have been approved by at least a majority of a plurality of acceptor nodes but have not been committed to the object store, the acceptor node implemented with a computer;

the acceptor node receiving back from the entity additional changes made by another user to the directory, the additional changes not committed to the object store;

a proposer node proposing the additional changes to the plurality of acceptor nodes, the plurality of acceptor nodes implemented with a plurality of computers, the proposer node implemented with another computer;

the acceptor nodes voting on the additional changes;

the proposer node broadcasting to the acceptor nodes that the additional changes have been approved in response to a majority but less than all of the acceptor nodes approving the additional changes, where an acceptor node did not vote in favor of the additional changes because the acceptor node: 1) was unavailable; or, 2) voted in reliance on incorrect information;

the acceptor node adding the additional changes to the map even though the additional changes are not yet committed to the object store.

* * * * *